United States Patent
Lee et al.

(10) Patent No.: US 12,246,635 B2
(45) Date of Patent: Mar. 11, 2025

(54) VACUUM ADIABATIC BODY, REFRIGERATING OR WARMING APPARATUS, AND VEHICLE

(71) Applicant: LG ELECTRONICS INC., Seoul (KR)

(72) Inventors: Sungsub Lee, Seoul (KR); Bongjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/225,328

(22) Filed: Jul. 24, 2023

(65) Prior Publication Data

US 2023/0365044 A1 Nov. 16, 2023

Related U.S. Application Data

(63) Continuation of application No. 16/484,143, filed as application No. PCT/KR2018/001860 on Feb. 13, 2018, now Pat. No. 11,752,913.

(30) Foreign Application Priority Data

Feb. 17, 2017 (KR) .................. 10-2017-0021559

(51) Int. Cl.
 B60N 3/10 (2006.01)
 F25D 11/00 (2006.01)
 F25D 23/00 (2006.01)

(52) U.S. Cl.
 CPC ............ B60N 3/104 (2013.01); F25D 11/003 (2013.01); F25D 23/006 (2013.01); *F25D 2201/14* (2013.01); *F25D 2400/10* (2013.01)

(58) Field of Classification Search
 CPC ...... F25D 11/003; F25D 23/006; F25D 23/06; F25D 23/061; F25D 23/062;
 (Continued)

(56) References Cited

U.S. PATENT DOCUMENTS

| | | |
|---|---|---|
| 664,055 A | 12/1900 | Manegold |
| 2,341,961 A | 2/1944 | Tanner |

(Continued)

FOREIGN PATENT DOCUMENTS

| | | |
|---|---|---|
| CN | 2691933 | 4/2005 |
| CN | 1623073 A | 6/2005 |

(Continued)

OTHER PUBLICATIONS

International Search Report and Written Opinion dated Jun. 18, 2018 issued in Application No. PCT/KR2018/001860.

(Continued)

*Primary Examiner* — Joseph F Trpisovsky
(74) *Attorney, Agent, or Firm* — KED & Associates LLP

(57) ABSTRACT

An vacuum adiabatic body is provided that may include a first plate member, a second plate member having a temperature different from the first space, a sealing part sealing the first plate member and the second plate member to provide a third space that has a temperature between the temperature of the first space and the temperature of the second space and is in a vacuum state, a conduit having at least a portion passing by the sealing part outside the third space to connect the first space to the second space, a supporting unit or bar maintaining the third space, a heat resistance unit or assembly for reducing a heat transfer amount between the first plate member and the second plate member, and a port or an exhaust port through which air of the third space is exhausted.

20 Claims, 23 Drawing Sheets

(58) Field of Classification Search
CPC ............... F25D 23/065; F25D 2201/14; F25D 2400/10; F25D 19/006; B60N 3/104
See application file for complete search history.

(56) References Cited

U.S. PATENT DOCUMENTS

| | | | |
|---|---|---|---|
| 5,865,037 | A | 2/1999 | Bostic |
| 6,658,876 | B1 * | 12/2003 | Richardson ........... F25D 31/003 62/457.2 |
| 2005/0235682 | A1 | 10/2005 | Hirai et al. |
| 2006/0266075 | A1 | 11/2006 | Itsuki |
| 2012/0104923 | A1 | 5/2012 | Jung et al. |
| 2013/0256319 | A1 | 10/2013 | Kuehl |
| 2013/0313267 | A1 | 11/2013 | Horio |
| 2016/0178269 | A1 | 6/2016 | Hiemeyer |
| 2017/0176092 | A1 | 6/2017 | Naik |

FOREIGN PATENT DOCUMENTS

| | | |
|---|---|---|
| CN | 101376357 | 3/2009 |
| CN | 201390178 | 1/2010 |
| CN | 205561376 | 9/2016 |
| CN | 110248840 | 9/2019 |
| DE | 299 10 901 | 8/1999 |
| EP | 2030836 | 3/2009 |
| JP | 2004-224236 | 8/2004 |
| KR | 10-2013-0074934 | 7/2013 |
| KR | 10-2014-0000922 | 1/2014 |
| KR | 10-2016-0147426 | 12/2016 |
| KR | 10-2017-0016242 | 2/2017 |
| RU | 33 989 U1 | 11/2003 |
| RU | 2 402 430 A | 3/2009 |
| RU | 2443950 | 2/2012 |
| WO | WO 2006/097801 A2 | 9/2006 |
| WO | WO 2017/023075 A1 | 2/2017 |
| WO | WO 2017/023077 | 2/2017 |
| WO | WO 2018/143690 A1 | 8/2018 |

OTHER PUBLICATIONS

Russian Notice of Allowance dated Apr. 20, 2020.
European Search Report dated Nov. 2, 2020 issued in Application No. 18754740.1.
Chinese Office Action dated May 25, 2021 issued in Application No. 201880010900.0.
U.S. Office Action dated Jul. 2, 2021 issued in parent U.S. Appl. No. 16/484,143.
U.S. Office Action dated Nov. 24, 2021 issued in parent U.S. Appl. No. 16/484,143.
Translation of Russian Notice of Allowance and Search Report dated Dec. 3, 2021.
Chinese Office Action dated Mar. 3, 2022 issued in CN Application No. 201880010900.0.
U.S. Office Action dated Apr. 7, 2022 issued in parent U.S. Appl. No. 16/484,143.
Chinese Office Action dated Jul. 27, 2022 issued in Application 201880010900.0 and English translation.
U.S. Office Action dated Oct. 6, 2022 issued in parent U.S. Appl. No. 16/484,143.
Australian Examination Report dated Apr. 24, 2023 issued in Application 2021261942.

* cited by examiner (a)

(b)

VACUUM ADIABATIC BODY, REFRIGERATING OR WARMING APPARATUS, AND VEHICLE

CROSS-REFERENCE TO RELATED APPLICATIONS

This application is a Continuation Application of U.S. patent application Ser. No. 16/484,143 filed Aug. 7, 2019, which application is a U.S. National Stage Application under 35 U.S.C. § 371 of PCT Application No. PCT/KR2018/001860, filed Feb. 13, 2018, which claims priority to Korean Patent Application No. 10-2017-0021559, filed Feb. 17, 2017, whose entire disclosures are hereby incorporated by reference.

BACKGROUND

1. Field

The present disclosure relates to a vacuum adiabatic body, a refrigerating or warming apparatus, and a vehicle.

2. Background

Refrigerators are apparatuses for storing products such as foods received in the refrigerator at a low temperature including sub-zero temperatures. As a result of this action, there is an advantage that a user's access or intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after it is fixedly mounted on the vehicle, is increasing in supply. The refrigerator for the vehicle is further increasing in demand due to an increase in supply of vehicles and an increase in premium-class vehicles.

A conventional configuration of the refrigerator for the vehicle will be described.

First, there is an example in which heat in the refrigerator is forcibly discharged to an outside of the refrigerator by using a thermoelement. However, there is a limitation in that a cooling rate is slow due to low thermal efficiency of the thermoelement, which may deteriorate user's satisfaction.

For another example, there is an example in which a refrigerant or cold air is drawn from an air conditioning system installed for air-conditioning an entire interior of the vehicle and used as a cooling source for the refrigerator for the vehicle.

In this example, there is a disadvantage that a separate flow path of air or refrigerant is required to draw the air or refrigerator from the air conditioning system of the vehicle. Also, there is a limitation that low-temperature energy is lost during the movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied.

However, in this example, since a part constituting the refrigeration cycle is large in size, most of the parts are mounted on a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo that is capable of being loaded in the trunk.

BRIEF DESCRIPTION OF THE DRAWINGS

The embodiments will be described in detail with reference to the following drawings in which like reference numerals refer to like elements wherein.

DETAILED DESCRIPTION

Figure 1:
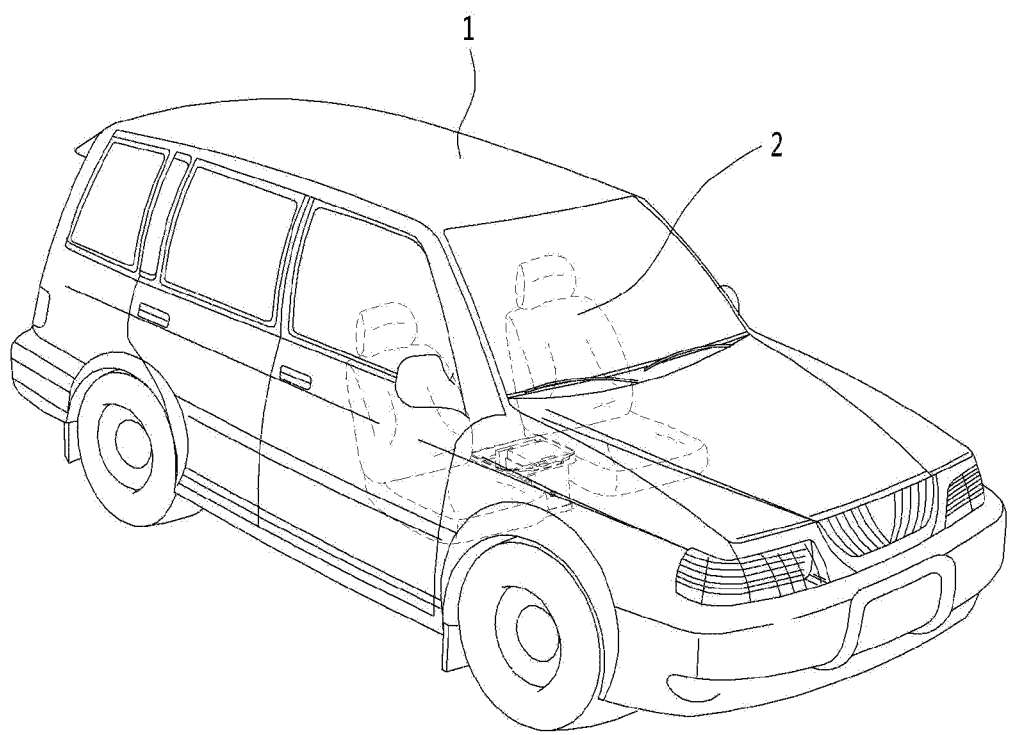
FIG. 1 is a perspective view of a vehicle according to an embodiment.

In the following description according to embodiments with reference to the drawings, the same reference numerals are given to different drawings in the case of the same constituents to clarify the description.

Also, in the description of each drawing, the description will be made with reference to the direction in which the vehicle is viewed from the front of the vehicle, rather than the front viewed by the driver based on the traveling direction of the vehicle. For example, the driver is on the right, and the assistant driver or passenger is on the left.

FIG. 1 is a perspective view of a vehicle according to an embodiment.

Referring to FIG. 1, a seat 2 on which a user is seated is provided in a vehicle 1. The seat 2 may be provided in a pair to be horizontally spaced apart from each other. A console is provided between the seats 2, and a driver places items that are necessary for driving or components that are necessary for manipulating the vehicle in the console. Front seats on which the driver and the assistant driver or passenger are seated may be described as an example of the seats 2.

It should be understood that the vehicle includes various components, which are necessary for driving the vehicle, such as a moving device such as a wheel, a driving device such as an engine, and a steering device such as a steering wheel.

The refrigerator for the vehicle according to an embodiment may be preferably placed in the console. However, an embodiment of the present disclosure is not limited thereto. For example, the vehicle refrigerator may be installed in various spaces. For example, the vehicle refrigerator may be installed in a space between rear seats, a door, a glove box, and a center fascia. This is one of factors that the vehicle refrigerator according to an embodiment is capable of being installed only when power is supplied, and a minimum space is secured. However, it is a great advantage of the embodiment in that it may be installed in the console between the seats, which is limited in space due to limitations in vehicle design.

Figure 2:
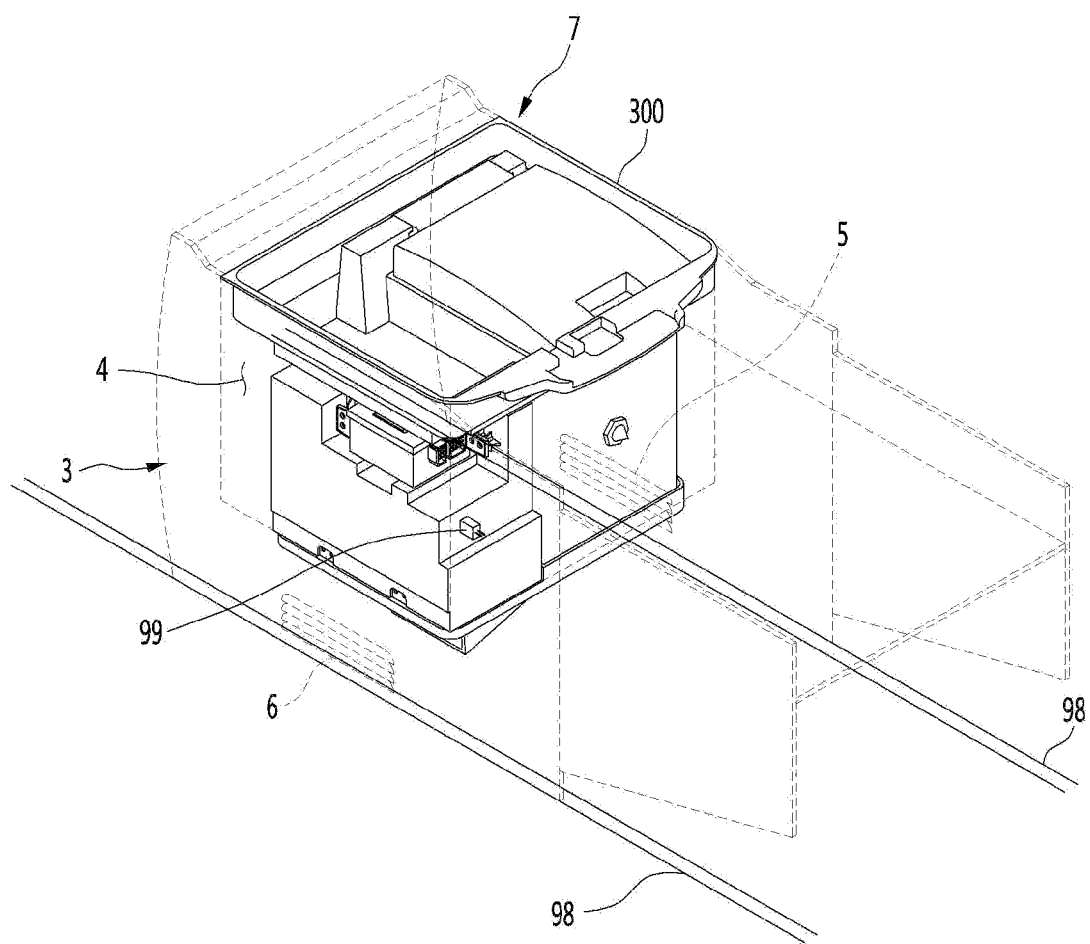
FIG. 2 is an enlarged perspective view illustrating a console of the vehicle.

FIG. 2 is an enlarged perspective view illustrating the console of the vehicle.

Referring to FIG. 2, a console 3 may be provided as a separate part that is made of a material such as a resin. A steel frame 98 may be further provided below the console 3 to maintain strength of the vehicle, and a sensor part 99 such as a sensor may be provided in a spacing part between the console 3 and the steel frame 98. The sensor part 99 may be a part that is necessary for accurately sensing an external signal and measuring a signal at a position of the driver. For example, an airbag sensor that directly impacts the life of the driver may be mounted.

The console 3 may have a console space 4 therein, and the console space 4 may be covered by a console cover or a cover 300. The console cover 300 may be fixed to the console 3 in a fixed type. Thus, it is difficult for external foreign substances to be introduced into the console through the console cover 300. A vehicle refrigerator 7 is seated in the console space 4.

A suction port 5 may be provided in a first or right surface of the console 3 to introduce air within the vehicle into the console space 4. The suction port 5 may face the driver. An exhaust port 6 may be provided in a second or left surface of the console 3 to exhaust warmed air while the vehicle refrigerator operates from the inside of the console space 4. The exhaust port 6 may face the assistant driver or passenger. A grill may be provided in each of the suction port 5 and the exhaust port 6 to prevent a user's hand from being inserted and thereby to provide safety, prevent a falling object from being introduced, and allow air to be exhausted to flow downward so as not to be directed to the person.

Figure 3:
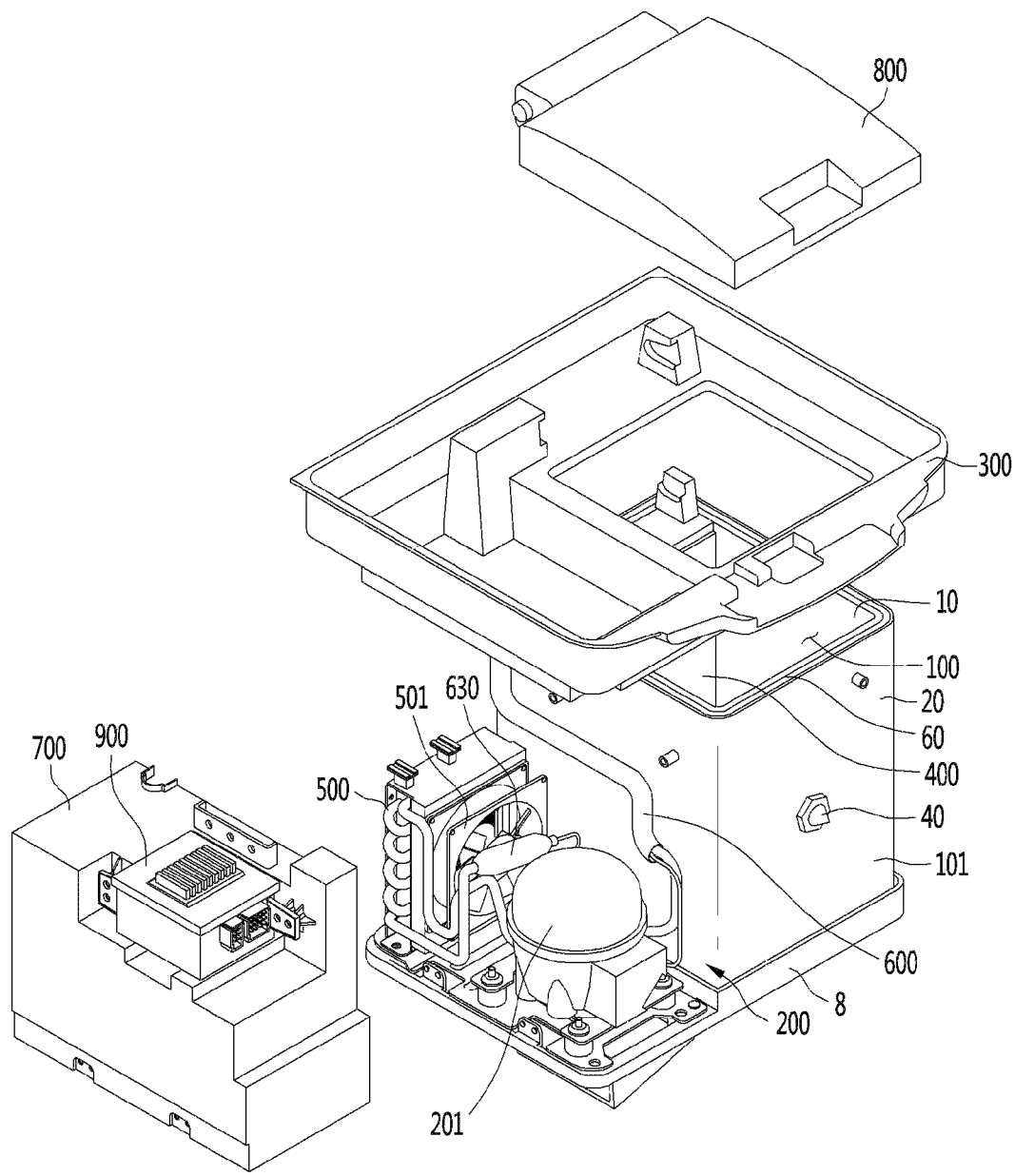
FIG. 3 is a schematic perspective view illustrating the inside of a vehicle refrigerator.

FIG. 3 is a schematic perspective view illustrating the inside of the vehicle refrigerator.

Referring to FIG. 3, the vehicle refrigerator 7 includes a refrigerator bottom frame or a refrigerator base 8 supporting parts, a machine room 200 provided in a left side of the refrigerator bottom frame 8, and a cavity or compartment 100 provided in a right side of the refrigerator bottom frame 8. The machine room 200 may be covered by a machine room cover 700, and an upper side of the cavity 100 may be covered by the console cover 300 and a door 800.

The machine room cover 700 may not only guide a passage of the cooling air, but also prevent foreign substances from being introduced into the machine room 200.

A controller 900 may be disposed on the machine room cover 700 to control an overall operation of the vehicle refrigerator 7. Since the controller 900 is installed at the above-described position, the vehicle refrigerator 7 may operate without problems in a proper temperature range in a narrow space inside the console space 4. That is to say, the controller 900 may be cooled by air flowing through a gap or space between the machine room cover 700 and the console cover 300 and separated from an inner space of the machine room 200 by the machine room cover 700. Thus, the controller 900 may not be affected by heat within the machine room 200.

The console cover 300 may not only cover an opened upper portion or top of the console space 4, but also cover an upper end edge of the cavity 100. In more detail, the console cover 300 may cover a sealing part or a seal 61 to reduce or minimize a heat loss due to heat transfer. A door 800 may be further installed on the console cover 300 to allow the user to cover an opening through which products are accessible to the cavity 100. The door 800 may be opened by using rear portions of the console cover 300 and the cavity 100 as hinge points. Here, the opening of the console cover 300, the door 800, and the cavity 100 may be performed by conveniently manipulating the door 800 by the user because the console cover 300, the door 800, and the cavity 100 are horizontally disposed when viewed from the user and also disposed at a rear side of the console. For example, the driver may conveniently open the door by using a rear hinge point as a support point through a driver's right hand.

A condensation module or assembly 500, a dryer or drier 630, and a compressor 201 may be successively installed in the machine room 200 in a flow direction of the cooling air. The condensation module 500 may also be referred to as a heat exchange module or assembly. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are accessible to the cavity 100.

The cavity 100 has an opened top surface or a top opening and five surfaces that are covered by a vacuum adiabatic body 101. The cavity 100 may be thermally insulated by an individual vacuum adiabatic body or at least one or more vacuum adiabatic bodies communicating with or in contact with each other. The cavity 100 may be provided by or formed within the vacuum adiabatic body 101. Also, the cavity 100 through which the products are accessible through one surface opened by the vacuum adiabatic body 101 may be provided.

The vacuum adiabatic body 101 may include a first plate member or plate 10 providing a boundary of a low-temperature inner space of the cavity 100, a second plate member or plate 20 providing a boundary of a high-temperature outer space, and a conductive resistance sheet 60 blocking heat transfer between the plate members 10 and 20. Since the vacuum adiabatic body 101 has a thin adiabatic thickness to maximally obtain adiabatic efficiency, a large capacity of the cavity 100 may be realized.

An exhaust and getter port or an exhaust port 40 for exhaust of the inner space or a vacuum space of the vacuum adiabatic body 101 and for installing a getter that maintains the vacuum state may be provided on one surface. The exhaust and getter port 40 may provide an exhaust and getter together to better contribute to miniaturization of the vehicle refrigerator 7. The getter may have a deposit or coating to absorb gas molecules.

An evaporation module or assembly 400 may be installed in the cavity 100. The evaporation module 400 may evaporate the refrigerant introduced into the cavity 100 through the refrigerant conduit 600 and forcibly blow cold air into the cavity 100. The evaporation module may be disposed at a rear side within the cavity 100. The evaporation module 400 may also be referred to as a heat exchange module or assembly.

Figure 4:
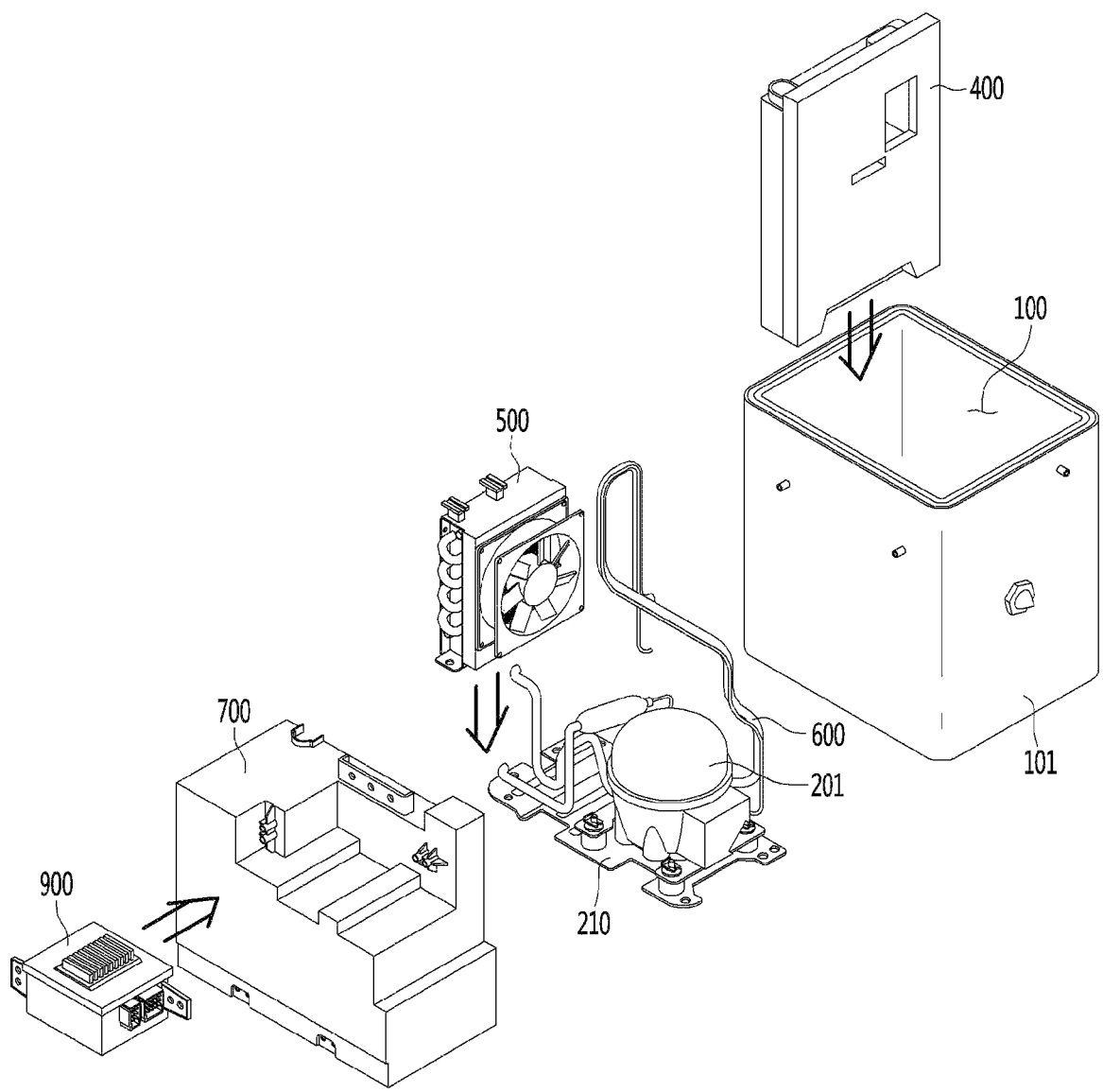
FIG. 4 is a view illustrating a connection relationship between a machine room and a cavity.

FIG. 4 is a view illustrating a connection relationship between the machine room and the cavity.

Referring to FIG. 4, the evaporation module 400 is accommodated into the cavity 100. That is to say, the evaporation module 400 is disposed in the inner space of the cavity 100 having the vacuum adiabatic body 101 as an outer wall. Thus, the machine room 200 may be improved in space efficiency, and the cavity 100 may increase in inner space.

The refrigerant conduit 600 guiding the refrigerant into the evaporation module 400 is guided to the evaporation module 400 by passing over the top surface of the cavity 100. It may be considered that the refrigerant conduit 600 passes through the vacuum adiabatic body 101 to reduce a volume thereof. However, since the vehicle has many vibrations, and the inside of the vacuum adiabatic body 101 is maintained in considerably high vacuum state, the sealing of the contact portion between the refrigerant conduit 600 and the vacuum adiabatic body 101 may be damaged. Thus, it is not preferable that the refrigerant conduit 600 passes through the vacuum adiabatic body 101.

For this, the refrigerant conduit 600 may include a first conduit or portion disposed in the cavity 100, a second conduit or portion disposed outside the cavity 100, and a third conduit or portion passing over an end of the cavity.

The evaporation module 400 may be preferably installed at the hinge point of the door within the cavity 100, i.e., a rear surface within the cavity 100. This is because a path that is necessary to allow the refrigerant conduit 600 to extend up to the evaporation module 400 is as short as possible for ensuring the internal volume of the cavity 100. It is more preferable that the refrigerant conduit 600 passing over the vacuum adiabatic body 101 passes through the hinge point of the door. If the evaporation module 400 is out of the hinge point of the door, the capacity of the cavity and the low-temperature energy may be lost due to the extension of the refrigerant conduit 600 and the adiabatic demands of the refrigerant conduit 600.

The condensation module 500 may be coupled by a rear coupling unit of a machine room bottom frame or base 210. Air suctioned through the condensation module 500 may cool the compressor 201 and then be discharged downward from the compressor 201.

The machine room cover 700 may be coupled to a left side of the cavity 100 to cover the machine room 200. An air flow for cooling may occur in an upper side of the machine room cover 700, and the controller 900 may be provided on the cooling passage to perform sufficient cooling action.

Figure 5:
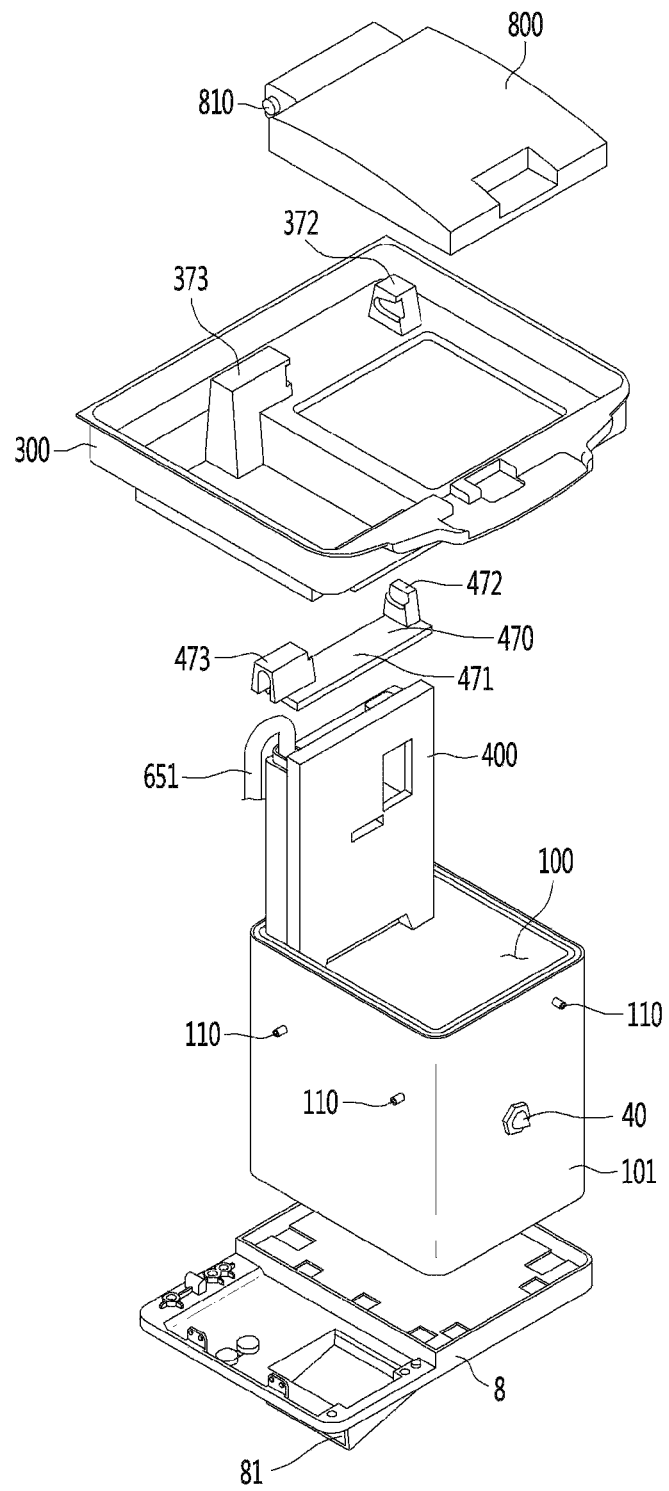
FIG. 5 is an exploded perspective view illustrating the cavity and peripheral parts related to sealing of the cavity.

FIG. 5 is an exploded perspective view illustrating the cavity and peripheral portions related to sealing of the cavity.

Referring to FIG. 5, the cavity providing an adiabatic function to the vacuum adiabatic body 101 is provided within five surfaces of the vacuum adiabatic body 101 on the right side of the refrigerator bottom plate 8, except for the top surface, which may be opened. The exhaust and getter port 40 is disposed on one surface of the cavity 100 to allow the vacuum adiabatic body 101 to generate vacuum.

A boss 110 may be mounted on an outer surface of the vacuum adiabatic body 101 to fix the console cover 300 and the machine room cover 700. The boss 110 may be coupled to the second plate member 20 defining an outer surface of the vacuum adiabatic body 101 through welding or caulking to prevent a problem in vacuum maintenance of a vacuum space part 50 within the vacuum adiabatic body 101 from occurring.

The evaporation module 400 is seated on a rear side within the cavity 100. The evaporation module 400 communicates with an expansion valve 640 and the compressor 201 in the machine room.

A refrigerant introduced into or discharged from the evaporation module 400 may have a different temperature. Thus, a refrigerant line inserted into the evaporation module 400 and a refrigerant line withdrawn from the evaporation module 400 may be heat-exchanged with each other. The heat-exchange action may be called heat regeneration. The outsides of the two conduits may be insulated by a regeneration adiabatic member 651 to prevent the refrigerant from being heat-exchanged with the cavity 100, the vacuum adiabatic member 101, or the air inside and outside the cavity 100 such that heat exchange occurs primarily between the two conduits during the heat regeneration.

The regeneration adiabatic member 651 may pass through the rearmost portion of the vacuum adiabatic body 101 defining the left wall of the cavity as described above. Also, the regeneration adiabatic member 651 may pass over the upper end of the vacuum adiabatic body 101. In detail, the regeneration adiabatic member 651 may pass over the vacuum adiabatic body 101 in the shortest direction perpendicular to the extension direction of the sealing part 61 disposed on the upper end of the vacuum adiabatic body 101.

Thus, the regeneration adiabatic member 651 may be directly guided to the evaporation module 400. Therefore, the inner space of the machine room 200 may be efficiently used to maximize the internal capacity of the cavity 100. Also, since the regeneration adiabatic member 651 does not pass through the vacuum adiabatic body 101, vacuum breakdown may be prevented even in the case of the vehicle having large vibration.

A plurality of parts may exist in the peripheral portion over which the vacuum adiabatic body 101 passes, and parts having temperatures different from each other may be spaced apart from each other to increase in possibility of a loss of the cold air. Also, since a hinge of the door 800 is provided, the possibility of the loss of the cold air may increase.

To solve the above-described limitations, a hinge part adiabatic member or an adiabatic hinge support 470 is disposed on an upper portion of the evaporation module 400 to cover the upper portion of the evaporation module 400 in addition to an entrance of the regeneration adiabatic member 651. An inner support 473 and an outer support 472, which are supports serving as an acting point of the hinge for the door, are provided in the hinge part adiabatic member 470. The inner support 473 and the outer support 472 may be connected to each other by a connection bar 471 to form one body.

The inner support 473 may function as a conduit accommodation part accommodating the refrigerant conduit to more reliably perform an adiabatic action.

The inner support 473 and the outer support 472 may be inserted into an inner bearing part 373 and an outer bearing part 372, which are provided in the console cover 300, respectively. That is to say, a portion supporting the hinge may extend up to the regeneration adiabatic member 651 and the evaporation module 400 to completely perform a strong supporting action with respect to a hinge shaft or a hinge pin 810 of the door.

The hinge shaft 810 of the door 800 may be hinge-coupled to the inner bearing part 373 and the outer bearing part 372 to perform an opening/closing of the door with respect to the hinge shaft 810.

Figure 6:
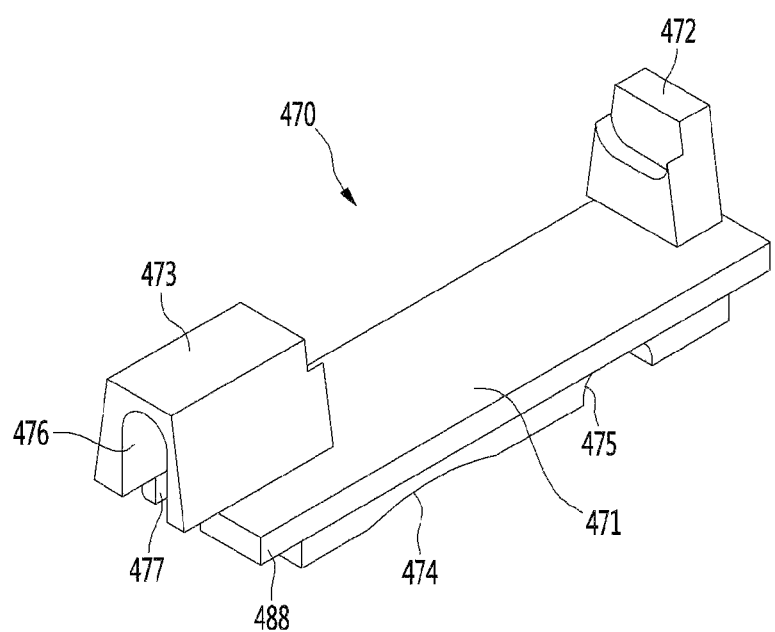
FIG. 6 is a perspective view of a hinge part adiabatic member.
Figure 7:
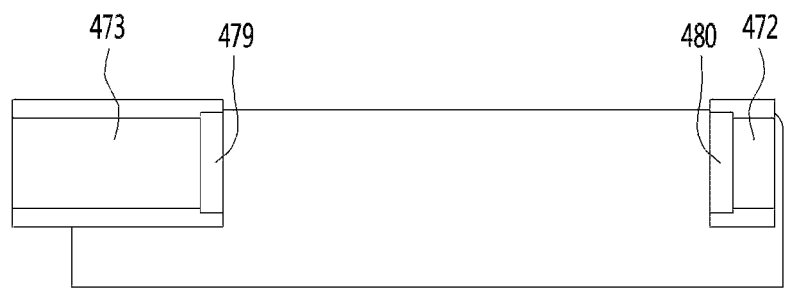
FIGS. 7 to 10 are plan, front, bottom, and left views of the hinge part adiabatic member.
Figure 8:
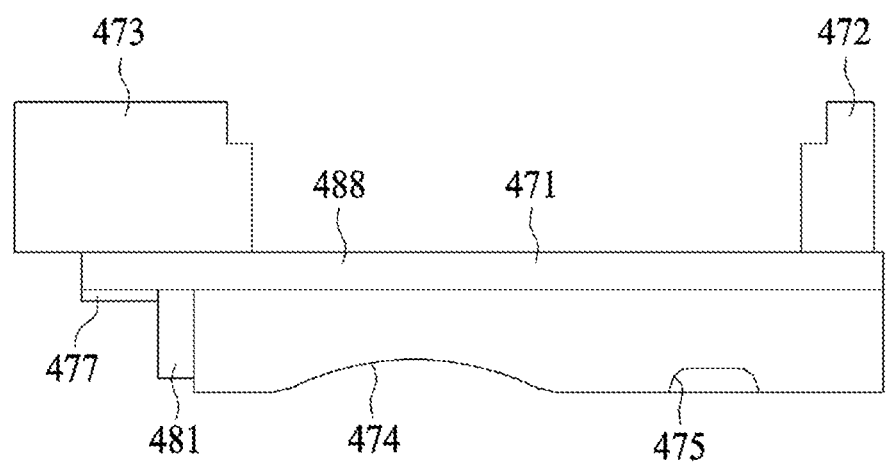
Figure 9:
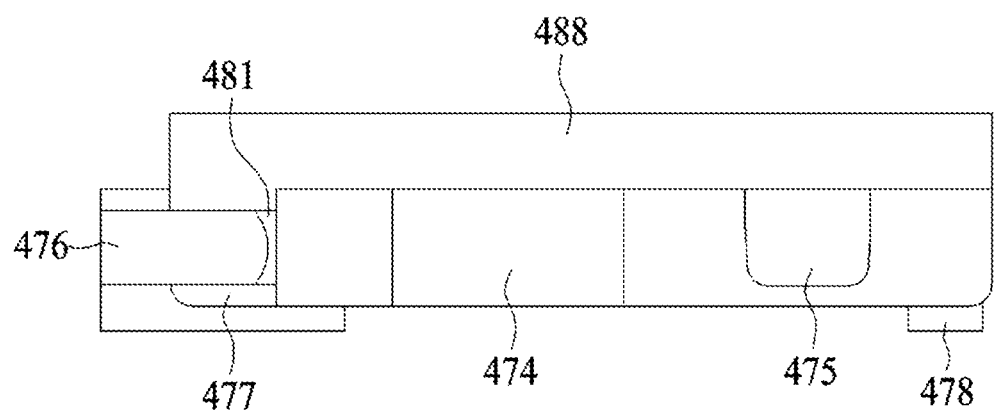
Figure 10:
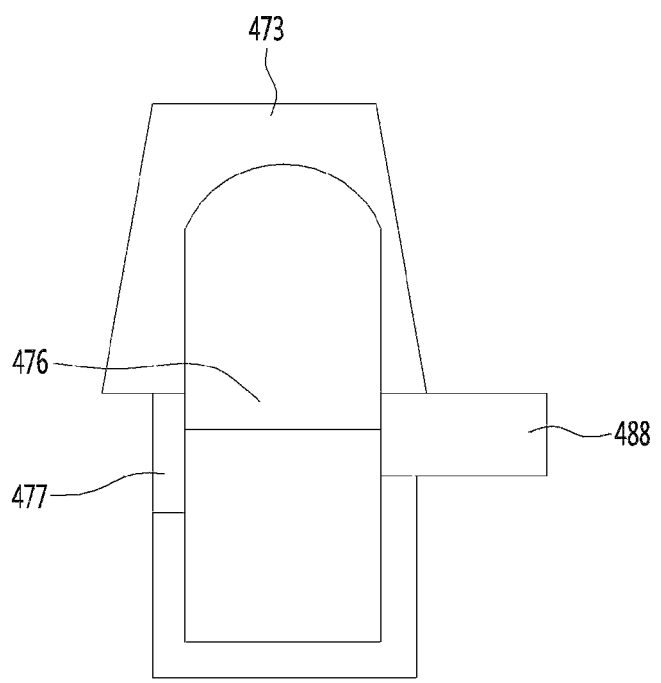

FIG. 6 is a perspective view of the hinge part adiabatic member.

Referring to FIG. 6, the hinge part adiabatic member 470 includes an inner support 473 covering the regeneration adiabatic member 651 and inserted into an inner bearing part or an inner bearing 373, an outer support 472 inserted into an outer bearing part or an outer bearing 372, and a connection bar 471 connecting the supports 472 and 473 to each other and thermally insulating an upper portion of the evaporation module 400.

Since the supports 472 and 473 are inserted into the bearing parts 372 and 373, the hinge part adiabatic member 470 and the console cover 300 may be integrated with each other. Also, since the console cover 300 is installed, the hinge part adiabatic member 470 may be fixed to a relative and absolute position or a predetermined position with respect to the peripheral parts including the cavity 100.

That is to say, the supports 472 and 473 may allow the parts in a rear space within the cavity 100 to come into close contact with each other while supporting the evaporation module 400. Thus, the parts may come into strong contact with each other to prevent the cold air from leaking. Also, a hinge action of the door 800 may be more secured.

Each of the supports 472 and 473 may have a structure that gradually decreases in cross-sectional area toward an end or side thereof so that the supports 472 and 473 are inserted into the bearing parts 372 and 373.

The inner support 473 may have a thickness greater than that of the outer support 472. This is because the inner support 473 is a portion surrounding the regeneration adiabatic member 651 to cause a heat loss due to the heat exchange to the outside of the regeneration adiabatic member 651.

A regeneration adiabatic member seating part or a seating insert 476 having a shape properly matching an outer appearance of the regeneration adiabatic member 651 is disposed on an inner surface of the inner support 473. For example, the inner support 473 may be curved in a smooth arc shape like the outer appearance of the regeneration adiabatic member 651. A lower end surface of the regeneration adiabatic member seating part 476 may be placed on an upper end of the vacuum adiabatic body 101. Thus, a vertical position relationship between the hinge part adiabatic member 470 and the cavity 100 may be clear, and a gap between the parts may not occur. The lower end surface of the regeneration adiabatic member seating part 476 may further extend outward from the vacuum adiabatic body 101. Thus, the adiabatic action may be performed from an inlet of the regeneration adiabatic member 651 to improve the adiabatic effect.

An inner fitting part or an inner seal 477 further extending downward from a rear portion of the regeneration adiabatic member seating part 476 may be further provided. The inner fitting part 477 may correspond to an inner surface of the vacuum adiabatic body 101, and thus, the position relationship in a front and rear direction between the vacuum adiabatic body 101 and the hinge part adiabatic member 470 may be more clearly maintained. An outer fitting part or an outer seal 478 corresponding to the inner fitting part 477 may also be provided on the outer support 472.

A part on which the evaporation module 400 is seated to be fitted is provided on the connection bar 471. Particularly, a cover seating part 488, a fan housing seating part 474, and a second compartment seating part 475 may be provided. The position relationship in a left and right direction with respect to the cavity of the hinge part adiabatic member 470 may be cleared or maintained by the cover seating part 488. Each of the fan housing seating part 474 and the second compartment seating part 475 has an arc shape corresponding to an upper shape of the evaporation module 400 to prevent the cold air from leaking through the contact part between the evaporation module 400 and the hinge part adiabatic member 470.

According to the above-described constituents, leakage of external air through the contact parts or various constituents coming into contact with the hinge part adiabatic member 470 may be prevented to enhance the adiabatic performance with respect to the portion that is vulnerable to heat leakage.

FIGS. 7 to 10 are plan, front, bottom, and left views of the hinge part adiabatic member.

Referring to FIGS. 7 to 10, the configuration of the hinge part adiabatic member 470 and an action of each constituent may be more clearly understood.

An outer fitting groove 480 and an inner fitting groove 479 are defined in inner portions of the supports 472 and 473, respectively. The inner fitting groove 479 may be configured to support a support portion of the console cover 300 in which each of the bearing parts 372 and 373 is thicker to accommodate the hinge shaft or hinge pins 810 of the door 800.

The second compartment seating part 475 may have a recessed structure and may not only be seated to correspond to a compartment, but also provide a path through which a structure such as a wire that is led out of the evaporation module 400 passes to the outside.

A skirt 481 further extends downward to an inside of the regeneration adiabatic member seating part 476. The skirt 481 may be a portion that further extends downward to help the perforation of the regeneration adiabatic member 651 that enters into the cavity 100.

Figure 11:
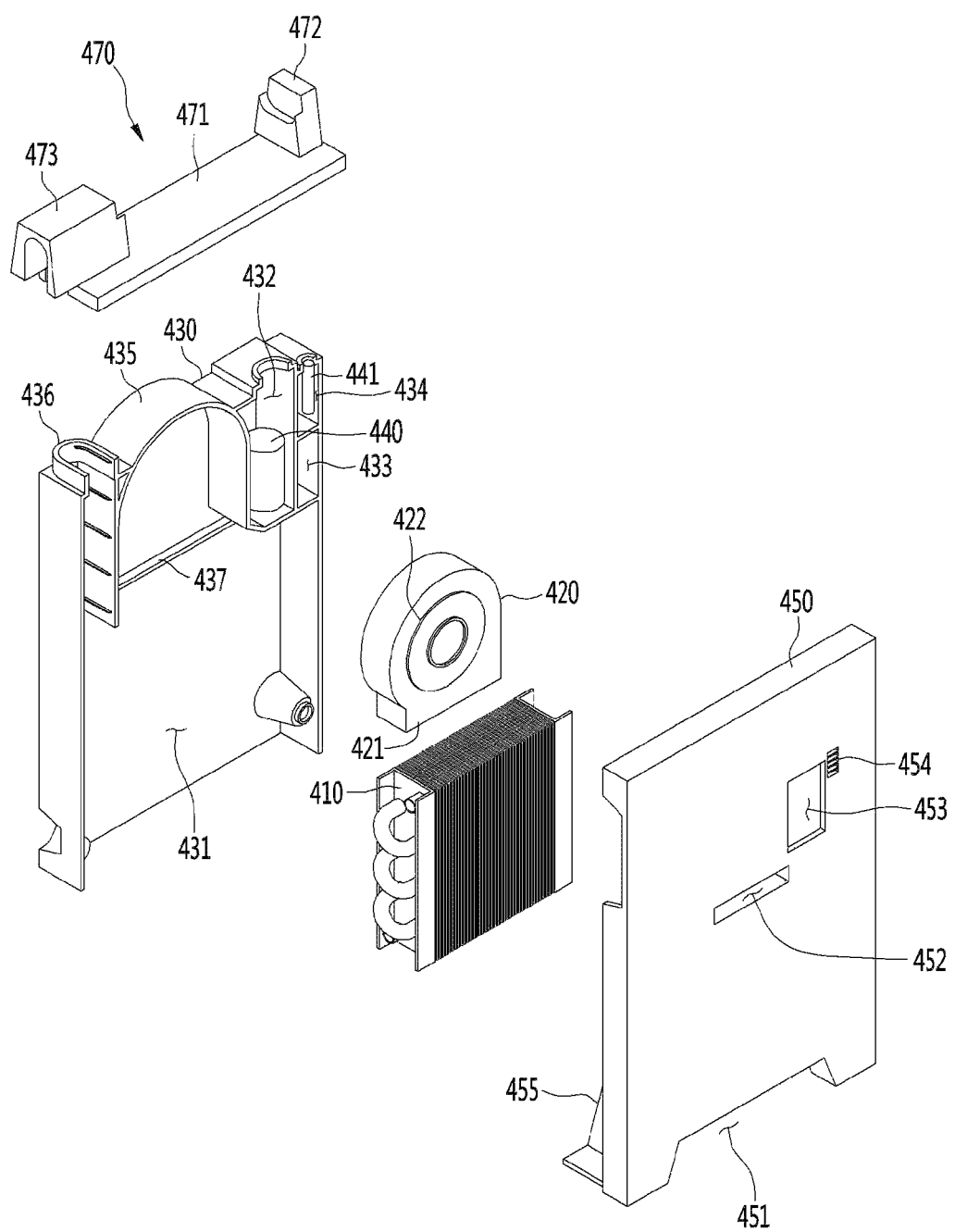
FIG. 11 is an exploded perspective view of an evaporation module.

FIG. 11 is an exploded perspective view of the evaporation module.

Referring to FIG. 11, the evaporation module 400 includes a rear cover 430 provided at a rear side to accommodate the parts and a front cover 450 provided at a front side of the rear cover 430 to face the cavity 100. A space may be provided in the evaporation module 400 by the front cover 450 and the rear cover 430 to accommodate the parts in the space. The front cover 450 may have an inner ledge or support 455 to maintain stability of the evaporation module 400.

In the space defined by the front cover 450 and the rear cover 430, an evaporator 410 is disposed at a lower side, and an evaporation fan 420 is disposed at an upper side. A centrifugal fan that is capable of being mounted in a narrow space may be used as the evaporation fan 420. More particularly, a sirocco fan including a fan inlet 422 having a large area to suction air and a fan outlet 421 blowing the air at a high rate in a predetermined discharge direction in a narrow space may be used as the evaporation fan 420.

The air passing through the evaporator 410 is suctioned into the fan inlet 422, and the air discharged from the fan outlet 421 is discharged to the cavity 100. To guide a flow of the introduced air into the evaporation fan 420, a predetermined space may be provided between the evaporation fan 420 and the rear cover 430.

A plurality of compartments may be provided in the rear cover 430 to accommodate the parts. Particularly, the evaporator 410 and the evaporation fan 420 are disposed in a first compartment 431 to guide a flow of air within the evaporation module 400. A lamp or a light source 440 may be disposed in a second compartment to brighten the inside of the cavity 100 so that the user looks at or views the inside of the cavity 100. A temperature sensor 441 is disposed in a fourth compartment 434 to measure an inner temperature of the cavity 100 and thereby to control a temperature of the vehicle refrigerator 7.

When the temperature sensor 441 disposed in the fourth compartment 434 measures the inner temperature of the cavity 100, the air flow in the cavity 100 and the cold air in the evaporator 410 may not have a direct influence on the temperature sensor 441. That is to say, the cold air of the evaporator 410 may not have a direct influence on a third compartment 433. Also, to minimize an effect of the air flow within the cavity 100 or the fourth compartment 434, the fourth compartment 434 may be disposed at a corner of the evaporation module 400.

Although the third compartment 433 is removed in some cases, the third compartment 433 may be provided to prevent an error in measurement of the inner temperature of the cavity 100 from occurring by conductive heat.

The fourth compartment 434 and the temperature sensor 441 are disposed at a right upper end of the evaporation module 400, which is farthest from the evaporator 410. This is to prevent the cold air from having an influence on the evaporator 410. That is to say, to prevent the cold air of the evaporator from having a direct influence on the fourth compartment 434 through the conduction, the fourth compartment 434 and the temperature sensor 441 may be isolated from the first compartment 431 by other compartments 432 and 433.

An inner structure of the first compartment 431 will be described in detail. A fan housing 435 on which the evaporation fan 420 is disposed is provided at an upper side, and an evaporator placing part 437 on which the evaporator 410 is placed is provided at a lower side.

A conduit passage 436 is provided in a left side of the fan housing 435. The conduit passage 436 may be a portion through which a refrigerant conduit 600 passing over the upper end of the vacuum adiabatic body 101 is guided into the evaporation module 400 and be provided in a left corner portion of the evaporation module 400. The refrigerant conduit 600 may include two conduits or tubes that are surrounded by the refrigerant adiabatic member 651 so that the two conduits through which the evaporation module 400 is inserted and withdrawn are heat-exchanged with each other. Thus, the conduit passage 436 may have a predetermined volume. The conduit passage 436 may vertically extend from a left side of the evaporation module 400 to improve space density inside the evaporation module 400 and directly guide the evaporation module 400 to the evaporator 410.

As described above, the evaporator 410 and the evaporation fan 420 are provided in the rear cover 430 to perform the cooling of air within the cavity and the circulation of air within the cavity.

The front cover 450 has an approximately rectangular shape like the rear cover 430. A cold air inflow hole 451 guiding the air inflow to the lower side of the evaporator 410 is defined in the front cover 450. A cold air discharge hole 452 aligned with the fan outlet 421 is defined in the front cover 450. The cold air discharge hole 452 may have a shape of which an inner surface is smoothly rounded to discharge air, which is discharged downward from the evaporation fan 420, forward.

A portion of the front cover 450 aligned with the second compartment 432 may be opened, or a window 453 may be provided on the portion of the front cover 450 so that light of the lamp 440 is irradiated into the cavity 100.

An air vent hole 454 is defined in the front cover 450 aligned with the fourth compartment 434. The air discharged from the cold air discharge hole 452 circulates inside the cavity 100 and then is introduced into the air vent hole 454. Thus, the inner temperature of the cavity 100 may be more accurately detected. For example, the inner temperature of the cavity 100 may be erroneously measured by a large amount of cold air discharged from the cold air discharge hole 452.

According to the above-described constituents, the evaporation module 400 may cool the evaporator 410 by using the refrigerant introduced through the conduit passage 436 as a cooling source. The air disposed in the lower portion of the cavity 100 is introduced through the cold air inflow hole 451 and then further cooled by passing through the evaporator 410. The cooled air may be suctioned through a central portion of the evaporation fan 420 that is the centrifugal fan and be discharged downward by centrifugal force.

The discharge direction of the air discharged from the evaporation fan 420 is changed into a front side via the cold air discharge hole 452 to cool an entire space within the cavity 100. The discharged air may cool the products within the cavity 100 and then be suctioned through the cold air inflow hole 451 to circulate.

Figure 12:
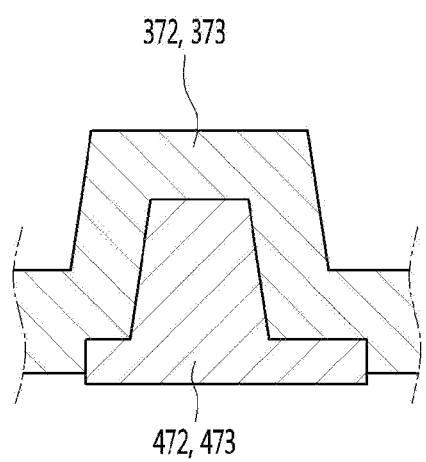
FIG. 12 is a longitudinal cross-sectional view illustrating portions of two parts in a state in which a support is inserted into a bearing part.

FIG. 12 is a longitudinal cross-sectional view illustrating portions of two parts in a state in which a support 472 or 473 is inserted into the bearing part 373 or 373.

Referring to FIG. 12, since the supports 473 and 472 are inserted to be fitted into the bearing parts 373 and 372, it is seen that the parts using the hinge part adiabatic member 470 as a medium are stably supported.

Since the hinge shaft 810 of the door 800 is stably and strongly supported, the position between the door 800 and the cavity 100 may be accurately aligned with each other, and a gap between the door 800 and the cavity 100 may be perfectly aligned with an opened surface of the console cover 300 and an opened top surface of the cavity 100.

Figure 13:
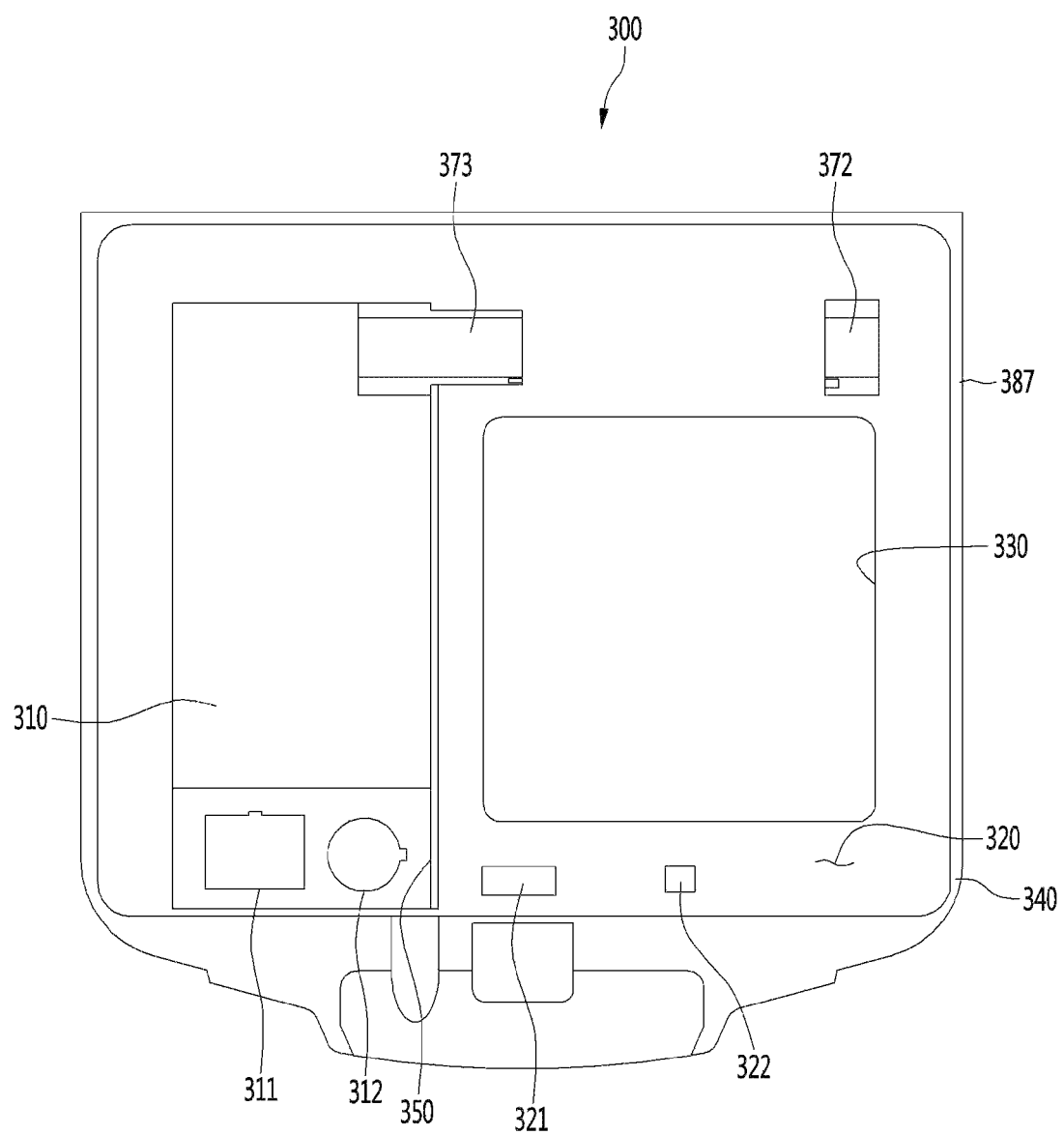
FIG. 13 is a plan view of a console cover.
Figure 14:
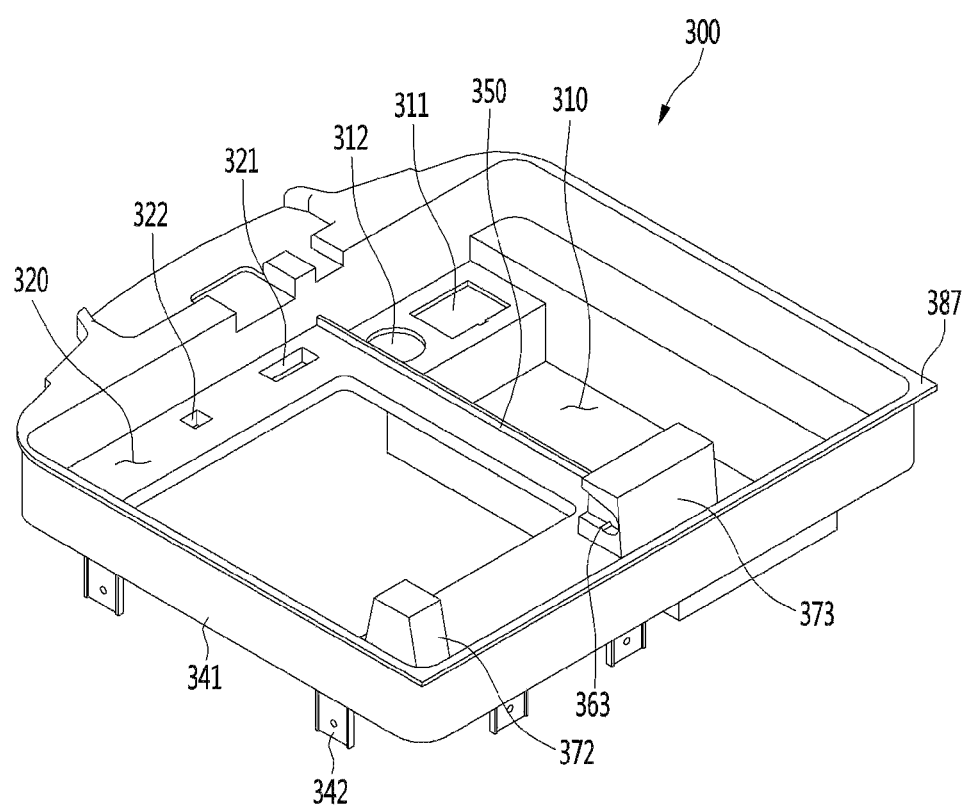
FIG. 14 is a bottom perspective view of the console cover.

FIG. 13 is a plan view of the console cover, and FIG. 14 is a bottom perspective view of the console cover.

Referring to FIGS. 13 and 14, the console cover 300 includes a cover edge 387 covering an opened top surface of the console space 4 and a skirt or side surface 341 extending downward from the cover edge 387. The cover edge 387 may define an outer frame 340 together with the skirt 341.

The cover edge 387 may be placed on an edge portion of the top surface of the console space 4 to seal the inside of the console space 4, thereby preventing foreign substances from being introduced into the console space 4 from the outside. The skirt 341 may reinforce a strength of the console cover 300 and increase accommodation space for the products to be placed inside the console cover 300.

The inside of the outer frame 340 may be divided into two sections including a product accommodation part or a first section 310 in which products that are necessary for the driving or other products are accommodated, and an entrance or a second section 320 on which the door 800 of the vehicle refrigerator 7 is disposed and through which the products in the vehicle refrigerator 7 are accessible to a driver. A separator 350 may protrude upward between the two sections.

The separator 350 may prevent dew or condensation, which may occur due to a temperature difference at an edge of the door 800, from flowing to the side of the product accommodation part 310. Thus, contamination of the product accommodation part 310 due to moisture may be prevented. The door 800 may be disposed at a side of the driver, i.e., at a right side. Thus, the driver may more easily access or dispense the products.

Although the product accommodation part 310 is advantageous in terms of capacity for accommodating products as the bottom surface descends a lot, since an air passage of a spacing part between a top surface of the machine room cover 700 and the product accommodation part 310 is narrow, the bottom surface may not descend a lot. The product accommodation part 310 may be provided above the machine cover 700, and thus may not have a depth as great as a depth of the entrance 320. However, the number of products that are accommodated at the lowest position of the positions within the console cover 300 may increase.

An auxiliary device port part or an aux port 311 to which an auxiliary device such as a USB is connected and a cigar jack part or cigarette lighter port 312 to which a cigarette lighter adaptor is connected may be provided at a front side of the product accommodation part 310.

A storage room opening part or an opening 330 is provided in the entrance 320 so that the user's hand may access an inside of the cavity 100. A door hook part 322 on which a door hook 382 is installed or coupled to and a door switch part 321 on which a door switch for controlling an opening/closing of the door may be provided at a front side of the storage room opening part 330.

The inner bearing part 373 and the outer bearing part 372 may be provided at a rear side of the entrance 320 to support the hinge shaft 810. Since the hinge shaft 810 is disposed at the rear side of the console cover 300, the user, i.e., the driver, may conveniently open or close the door while driving. The inner bearing part 373 may have a recess or groove 363 in which the hinge shaft 810 may be inserted.

At least one console coupling part 342 may be provided on the bottom surface of the console cover 300 in each side or direction. The console coupling part 342 may be coupled to each of portions corresponding to the boss 110 of the vacuum adiabatic body 101 and the machine room cover 700 and then integrated with the vehicle refrigerator 7.

Figure 15:
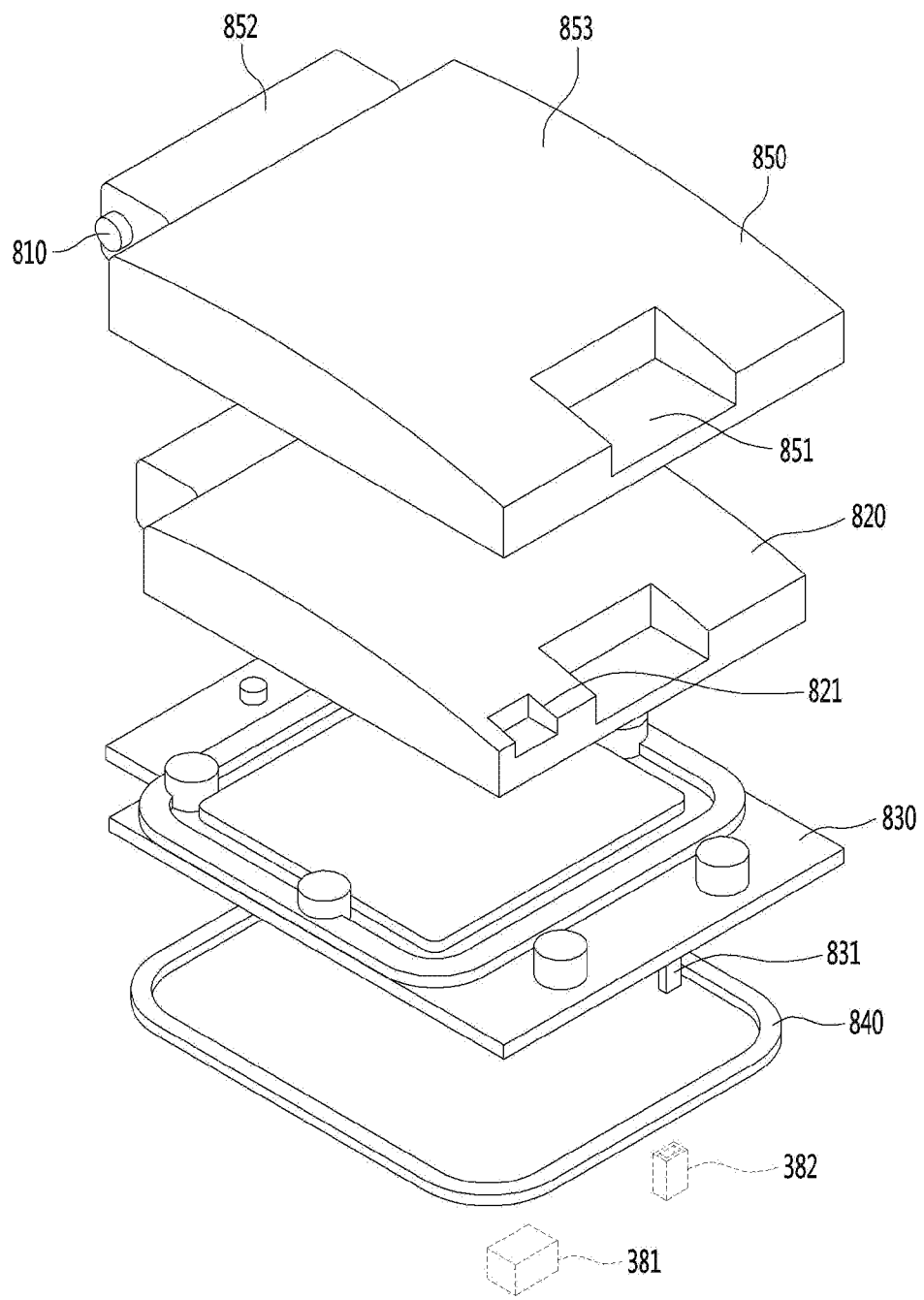
FIG. 15 is an exploded perspective view of a door.

FIG. 15 is an exploded perspective view of the door.

Referring to FIG. 15, the door 800 includes an upper cover 850, a lower cover 830, and a door adiabatic member or an adiabatic door support 820 inserted between the upper cover 850 and the lower cover 830.

The upper cover includes a covering part or lid 853 having a wide rectangular area that is big enough to open and close the entrance 320, a hinge part or a hinge 852 disposed at a rear side of the covering part 853, and a handle groove 851 disposed at a front side of the covering part 853.

The hinge shaft 810 may protrude from left and right sides of the hinge part 852 and then be inserted into the inner bearing part 373 and the outer bearing part 372, which are provided in the console cover 300. When the hinge shaft 810 is inserted into the bearing parts 372 and 373, the hinge shaft 810 may serve as a center of a hinge rotation motion of the door 800.

The door adiabatic member 820 may be filled into an inner space defined by the upper cover 850 and the lower cover 830 to improve adiabatic performance of the door. A magnet 821 may be installed at a predetermined position of the door adiabatic member 820 or the covers 830 and 850, which corresponds to a door switch 381. The door switch 381 may be provided under the door switch part 321. The magnet 821 may measure magnetic force as the door switch 381 and the magnet 821 approach each other or are spaced apart from each other to determine a distance therebetween and thereby to recognize an opened state of the door through the distance.

A protrusion or a lock 831 may be disposed on the lower cover 830. The protrusion 831 may maintain a closed state of the door by acting with a door hook or a hook insert 382 to selectively allow the door 800 to be opened. The opened state and the closed state of the door 800 may be selected according to a number of pressings of the door 800. Here, when the door 800 is opened, the door 800 may move in a direction to open itself by an action of a spring or an elastic member inside of the door hook insert 382. The door hook insert 382 may be provided below the door hook part 322. The spring may be compressed when the door 800 closes, and when the door 800 is selected to be open, a restoring force of the spring may push or release the protrusion 831 such that the door 800 opens.

A door sealer 840 may be disposed on a bottom surface of the lower cover 830 to seal the storage room opening part 330 from an outside of an edge of the opening in the storage room opening part 330.

Figure 16:
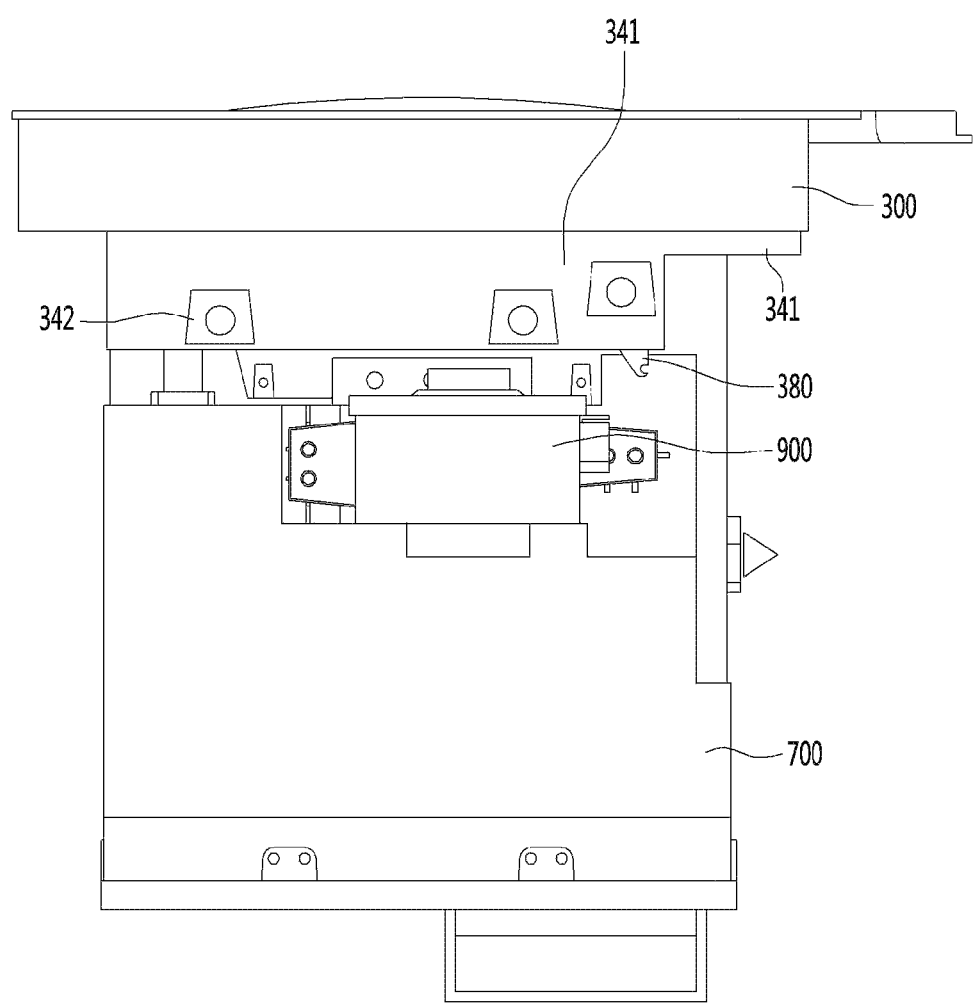
FIG. 16 is a left view of a vehicle refrigerator.
Figure 17:
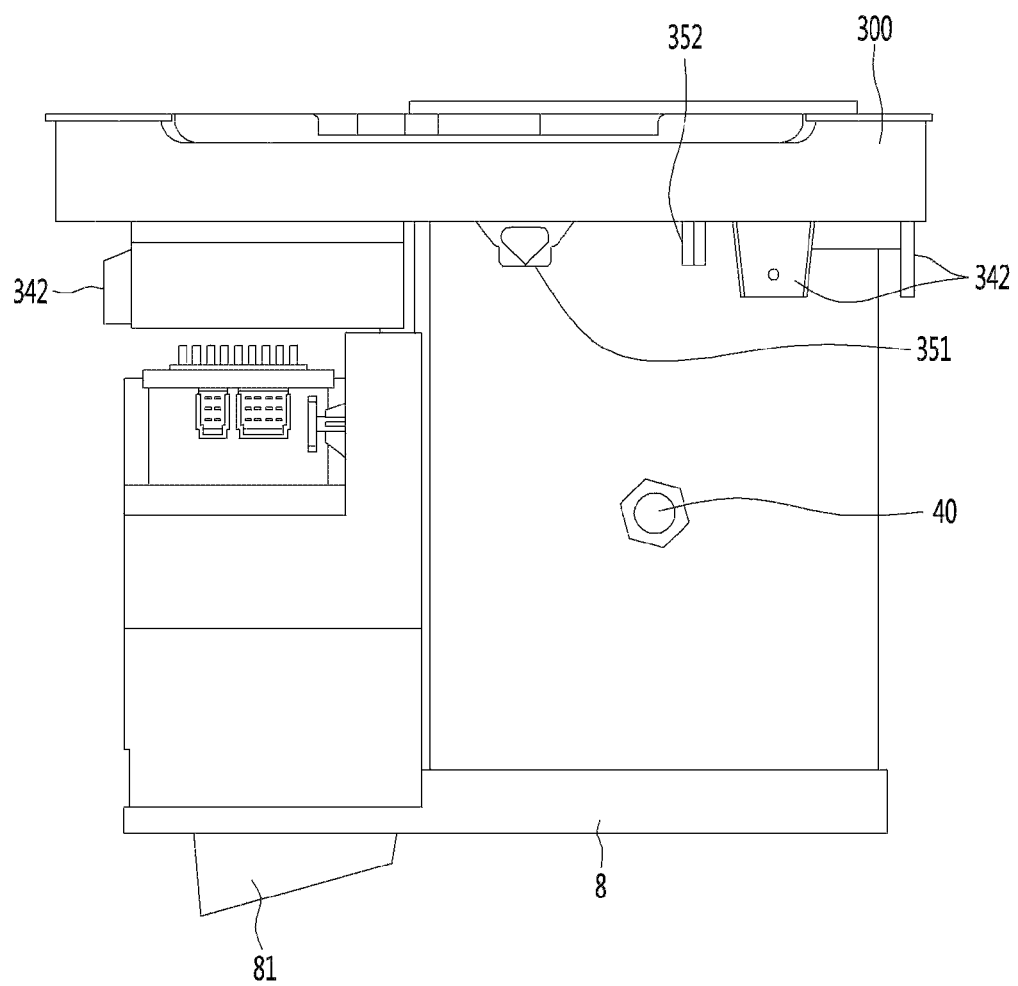
FIG. 17 is a front view of the vehicle refrigerator.

FIG. 16 is a left view of the vehicle refrigerator, and FIG. 17 is a front view of the vehicle refrigerator.

Referring to FIGS. 16 and 17, the console cover 300 may be coupled to the machine room cover 700 and the vacuum adiabatic body 101 by the console coupling part 342. The console coupling part may be coupled to the console cover 300, the machine room cover 700, and the vacuum adiabatic body 101 at once. That is to say, the coupling between the parts may be performed at once by the console cover 300 to form one body to prevent air from leaking without generating a gap between the parts and prevent vibration noise due to the gap between the parts from occurring.

The door hook 352 and the door switch 351 may be fixed to the bottom surface of the console cover 300 and be provided at positions that are respectively aligned with the protrusion 831 and the magnet 821.

A wire hook 380 may be disposed at a predetermined position of the console cover 300 at which a necessary wire for the door switch 381 is placed in a path that is directed to the controller 900. The wire may be fixed by the wire hook 380 even through vibration of the vehicle during the driving of the vehicle or vibration of the compressor occurs.

Figure 18:
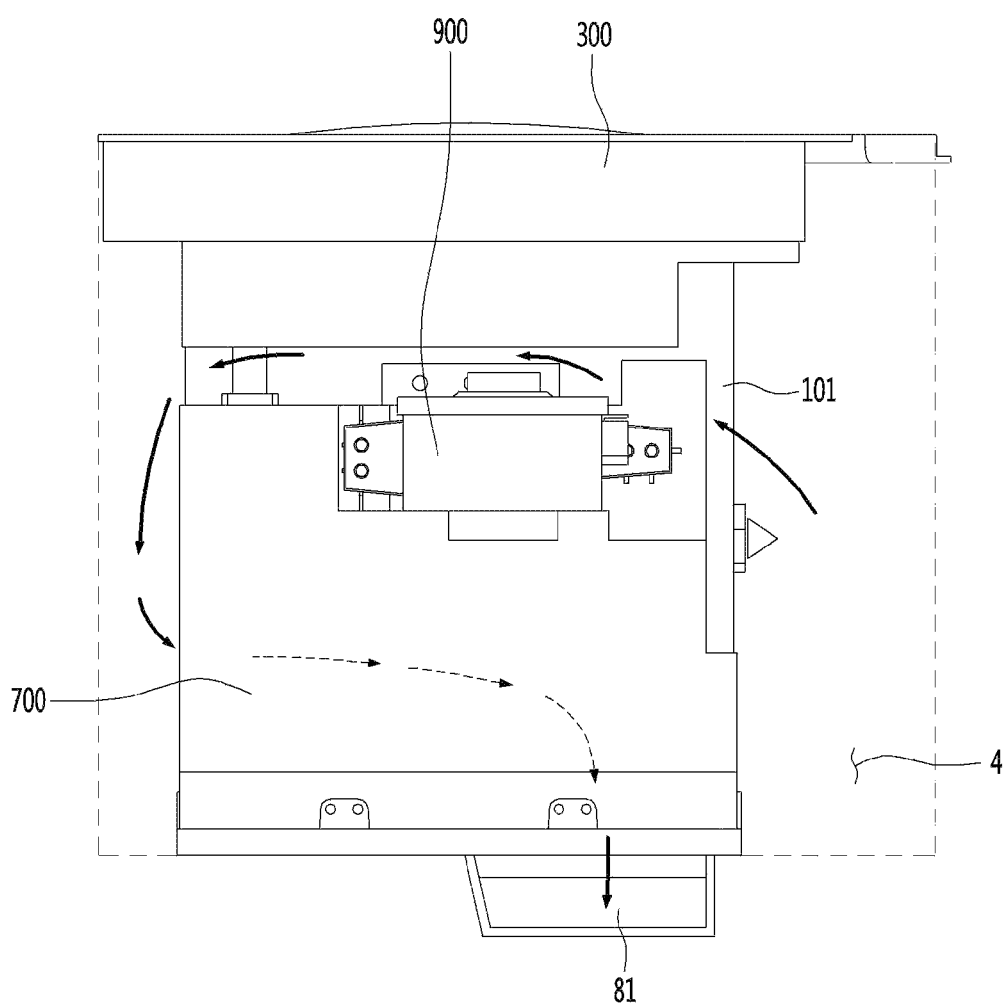
FIG. 18 is a left view of the vehicle refrigerator.

FIG. 18 is a left view of the vehicle refrigerator.

Referring to FIG. 18, air introduced into the suction port 5 moves to the machine room 200 through the spacing part between an outer surface of the vacuum adiabatic body 101, which corresponds to the front side of the cavity 100, and an inner surface of the console space 4. That is, the air moves to a left direction.

Thereafter, the air moves backward through the spacing part between the top surface of the machine room cover 700 and the bottom surface of the console cover 300 and then moves downward to be introduced into the machine room cover 700. For this, a large opening (not shown) may be defined in a rear side of the machine room cover 700.

The air may successively cool the condensation module 500, the dryer 630, and the compressor 201 in the machine room cover 700 and then be discharged to the outside of the vehicle refrigerator 7 through a passage guide 81 provided below the compressor 201. The exhaust port 6 may be disposed close to the passage guide 81 to allow the air discharged through the passage guide 81 to circulate without staying in the console space 4. Thus, the cooling efficiency may be improved.

Figure 19:
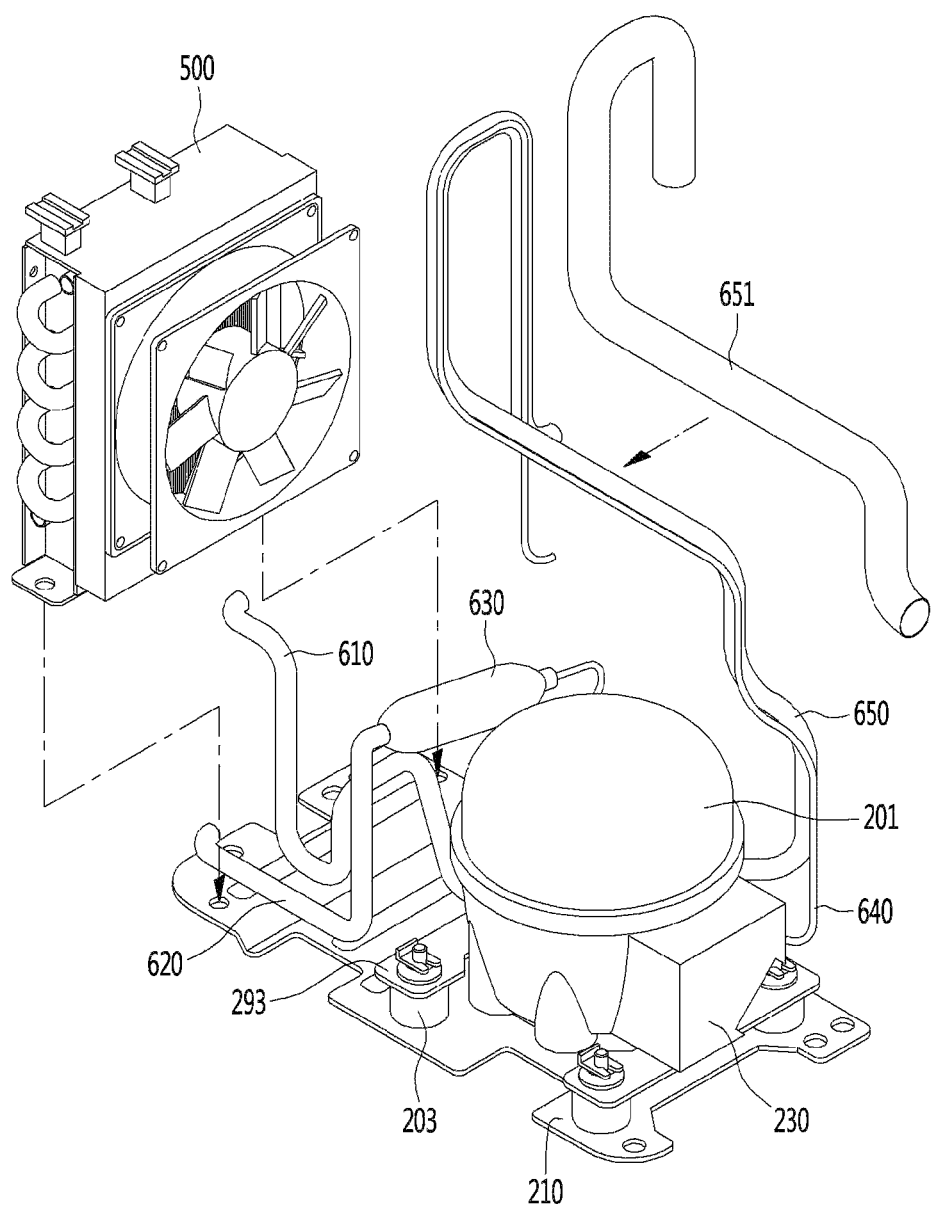
FIG. 19 is an exploded perspective view of the machine room.
Figure 20:
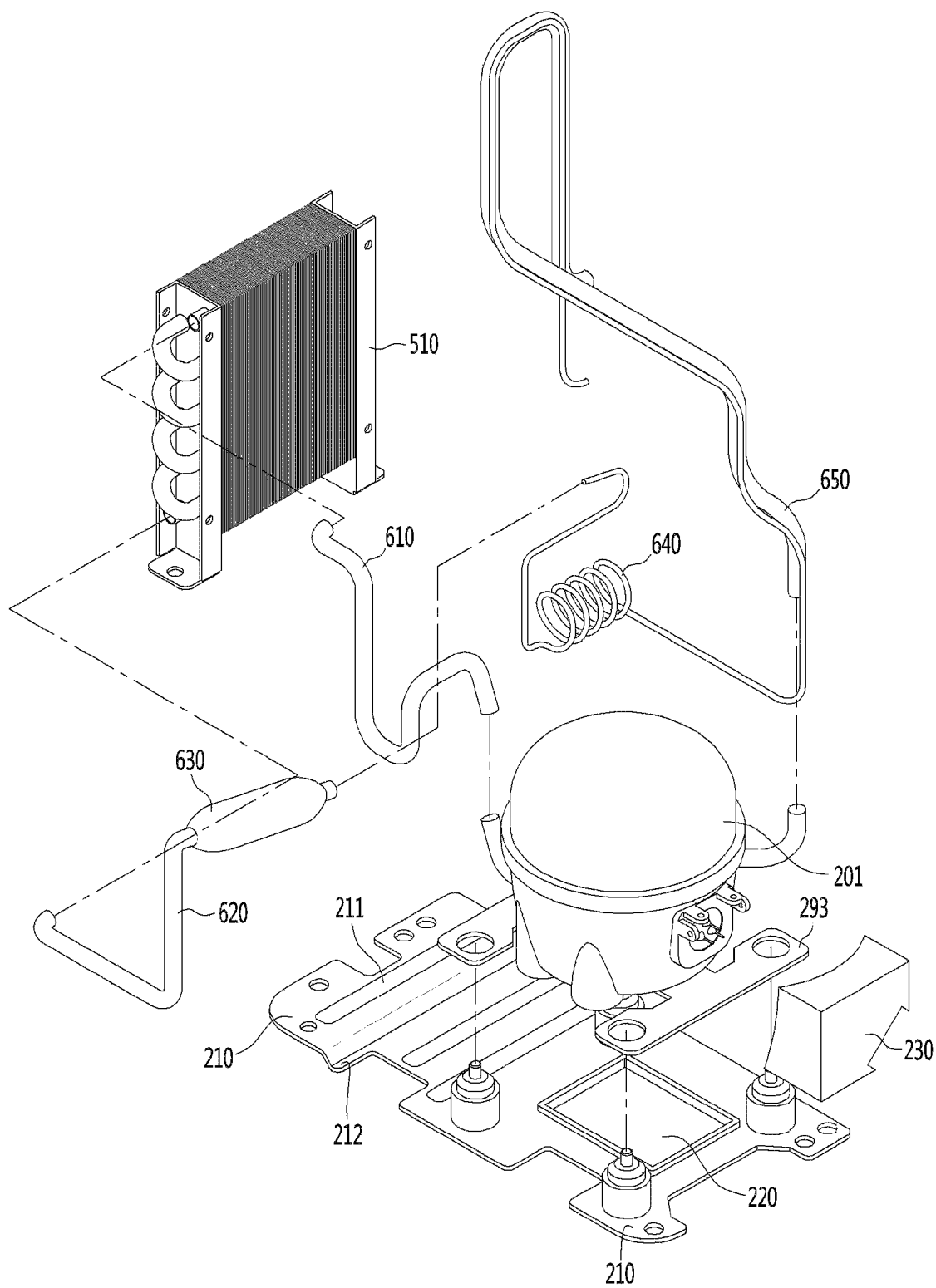
FIG. 20 is an exploded perspective view when each of parts in the machine room is viewed with respect to a flow of a refrigerant.
Figure 21:
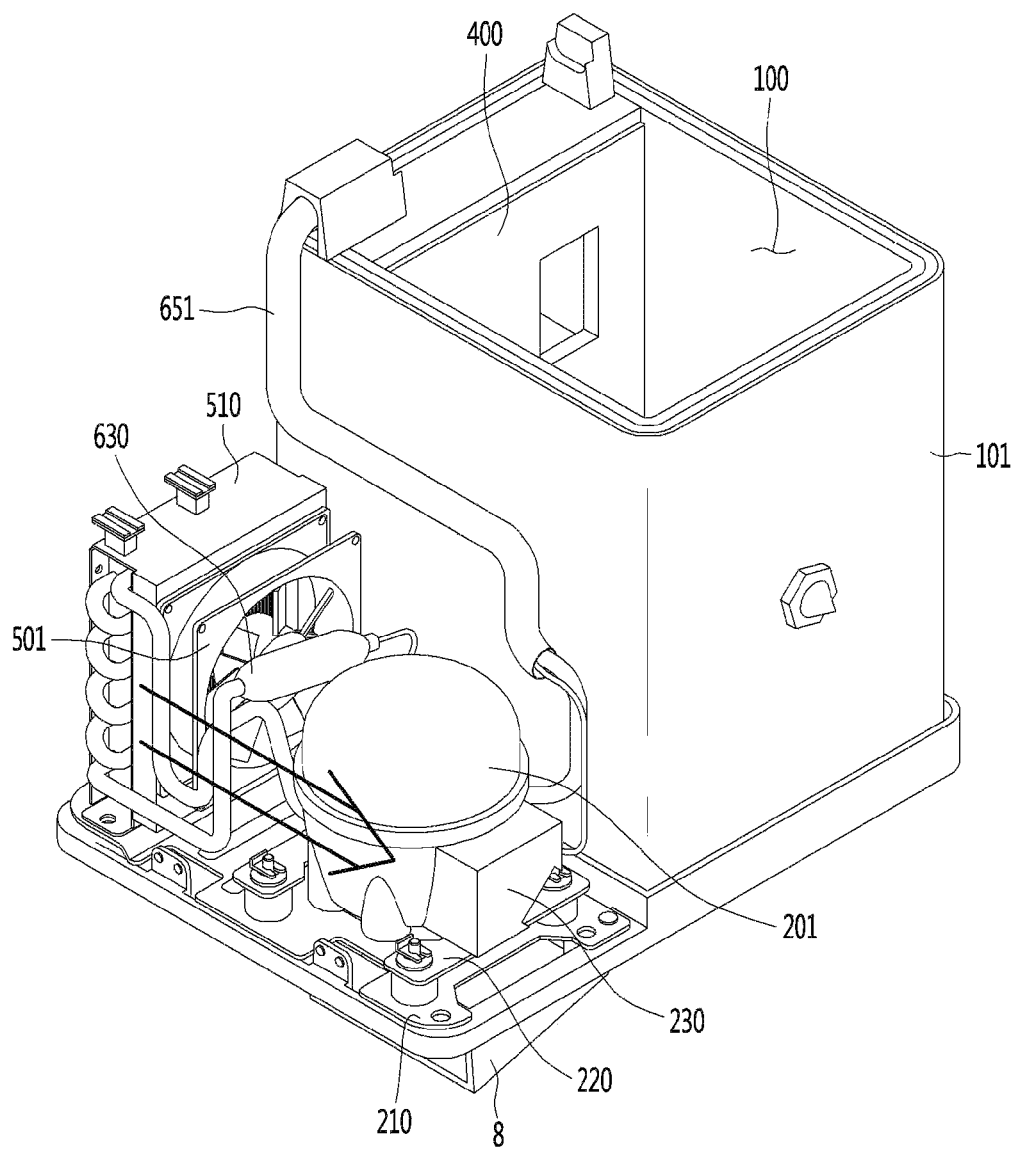
FIG. 21 is a perspective view illustrating only the machine room and the cavity.

FIG. 19 is an exploded perspective view of the machine room, FIG. 20 is an exploded perspective view when each of the parts in the machine room is viewed with respect to a flow of the refrigerant, and FIG. 21 is a perspective view illustrating only the machine room and the cavity. Some of the components are not shown for the sake of convenience.

Referring to FIGS. 19, 20, and 21, the condensation module 500 is fixed in a manner in which the condenser 510 is coupled to the machine room bottom frame 210, a condenser spacer (see reference numeral 505 of FIG. 22) is coupled to the condenser 510, and the condensation fan (see reference numeral 501 of FIG. 22) is coupled to the condenser spacer 505. The parts may be installed in the narrow space by the condensation module 500 having the above-described structure, and an occurrence of noise due to the condensation fan 501 may be reduced by the condenser spacer 505.

The condensation fan 501 may not increase infinitely in rotation rate due to the influence of the noise. Here, the noise is undesirable because the noise makes the person boarding in the vehicle to be uncomfortable. According to experiments, it is confirmed that noise having a level of about 2,000 rpm does not affect the driver or passenger.

The condenser spacer 505 may solve limitations of noise due to rotation of fan blades, slip of air, and shock waves propagating through the air, secure a flow rate of the air, and achieve the compact inside of the machine room 200.

An operation in the machine room 200 with respect to a flow or air will be described below.

The suctioned air in the condensation fan 501 may pass through the condenser 510 to condense the refrigerant. The air suctioned into the machine room 200 may pass through the dryer 630 and the expansion valve or conduit 640 and then cool the compressor 201 finally and be discharged to the outside. Here, the flow of the air may be a flow that proceeds forward from a rear side of the machine room 200.

To secure sufficient condensation performance in the condensation module 500, the air introduced into the machine room 200 cools the condenser 510 first. Also, since operation conditions of the compressor 201 are permissible even at a relatively high temperature, the introduced air of the machine room 200 cools the compressor 201 finally. The dryer 630 and the expansion valve 640 may be disposed between the condenser 510 and the compressor 201 to correspond to a use temperature of each part.

The air cooling the compressor 201 may be discharged through a machine room discharge hole 220 provided in the machine room bottom frame 210. The air discharged through the machine room discharge hole 220 may be discharged to the outside of the vehicle refrigerator 7 through the passage guide 81 of the refrigerator bottom frame 8.

A terminal or a compressor terminal supplying power to the compressor 201 is disposed at a front side of the compressor 201, i.e., a front side of the machine room 200, in which an influence of the air flow is less, in the machine room 200. This is for improving reliability of the product by making it difficult for dust caused by the air flow to approach an electric system as much as possible. The compressor terminal may be covered from the outside by a compressor terminal cover 230.

An operation in the machine room 200 with respect to a flow or a refrigerant will be described below.

A refrigerant compressed in the compressor 201 is introduced to an upper side of the condenser 510 through a first passage 610 and then condensed by external air. Compression and condensation efficiency of the refrigerant is a major factor that determines overall cooling performance of the refrigeration cycle.

In the vehicle refrigerator 7 according to an embodiment, the compressor 201 operates at an operation frequency of maximum 60 Hz to suppress the occurrence of excessive noise. Also, to prevent problems in oil supply due to the vibration while the vehicle is driven, oil may be supplied at the highest level into the compressor 201. The operation frequency of the compressor 201 is preferably as high as possible, but may be uncomfortable to the passenger, so it is preferable to limit the operation frequency as described above. In the same manner, the condensation fan 501 is limited to the number of revolutions to about 2,000 rpm to suppress the excessive noise.

In this embodiment, it is confirmed that sufficient cooling performance is exhibited even under the operation conditions of the refrigeration cycle.

The condensed refrigerant is introduced into the dryer 630 through a second passage 620. The dryer 630 may be a receiver dryer or a receiver drier in which a function of a dryer and a function of a receiver are performed together. Thus, the inner space of the machine room 200 may be further reduced.

The refrigerant supplied from the dryer 630 may be supplied to the evaporation module 400 by passing through the expansion valve 640. The refrigerant evaporated in the evaporation module 400 is introduced again into the compressor 201 through a fourth passage or conduit.

The expansion valve 640 and the fourth passage 650 may regenerate heat through heat exchange. For this, the two conduits 640 and 650 are bent with the same shape to come into contact with each other. Also, the regeneration adiabatic member 651 may surround the two conduits 640 and 650 together to insulate the conduits 640 and 650 from the outside. The regeneration adiabatic member 651 may extend from an inlet end of the compressor 201 up to the evaporation module 400 so that sufficient heat regeneration occurs between the two conduits 640 and 650.

The regeneration adiabatic member 651 may further extend up to the inside of the evaporation module 400. Thus, dew formed by the heat exchange action between the two conduits 640 and 650 and the cold air is prevented from leaking to the outside of the cavity 100. Thus, failure in the machine room 200 may be prevented from occurring.

The parts within the machine room 200 are primarily supported by the machine room bottom frame 210. The machine room bottom frame 210 is coupled to the refrigerator bottom frame 8. The machine room bottom frame 210 includes a foaming part for reinforcing strength and reducing vibration.

The foaming part includes a second foaming part 212 disposed between a portion on which the condensation module 500 is disposed and a portion on which the compressor 201 is disposed and foamed at a relatively deep depth to prevent different operation frequencies from being affected with respect to each other and a first foaming part 211 for reducing the vibration generated in each part and the vehicle. The foaming parts 211 and 212 may increase an inertia moment of the machine room bottom frame 210 to improve strength.

The compressor 201 is coupled to the machine room bottom frame 210 in a state of being fixed to a compressor bottom frame 293. A damper 203 is interposed in the contact part between the compressor bottom frame 293 and the machine room bottom frame 210 to prevent the vibration of the compressor from being transmitted to other parts and the outside as far as possible.

Figure 22:
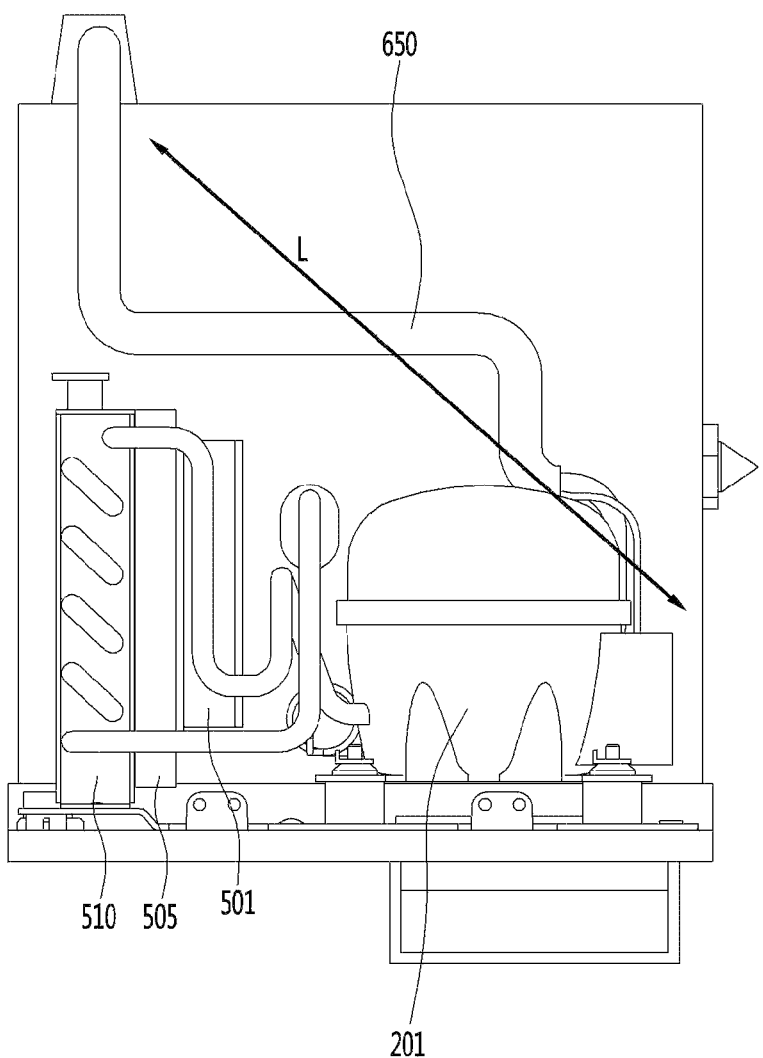
FIG. 22 is a schematic left view of the vehicle refrigerator.

FIG. 22 is a schematic left view of the vehicle refrigerator.

Referring to FIG. 22, the condensation module 500 is disposed at the rear side of the machine room 200, and the compressor 201 is disposed at the front side of the machine room 200. A suction-side conduit of the compressor 201 may be disposed at the front side of the machine room 200 by adjusting the position of the compressor 201. Thus, the heat regeneration path of the fourth passage 650 and the expansion valve 640 may be maximized in length.

In detail, it is difficult to make a separate roofing for the heat regeneration in the narrow machine room 200. To overcome this limitation, in this embodiment, the suction side of the compressor may be disposed farthest from the suction side of the evaporation module 400 so that the conduit in which the heat regeneration is performed may be provided as long as possible. In the drawing, L represents the distance.

Also, the fourth passage 650 and the expansion valve 640 increase in length to maximally suppress the transmission of the vibration of the compressor to the evaporation module 400.

The regeneration adiabatic member 651 extends along an outer wall of the vacuum adiabatic body 101 defining the cavity 100. Since the conduit does not occupy the inner space of the machine room 200, the gap between the machine room cover 700 and the console cover 300 is made as large as possible to prevent the air flow from being obstructed. The gap between the console cover 300 and the machine room cover 700 may define a flow interval of air.

The condensation module 500 has a structure in which the condenser spacer 505 may be interposed between the condenser 510 and the condensation fan 501. Thus, it is possible to achieve effects of ensuring the sufficient air volume and reducing the noise generation.

Figure 23:
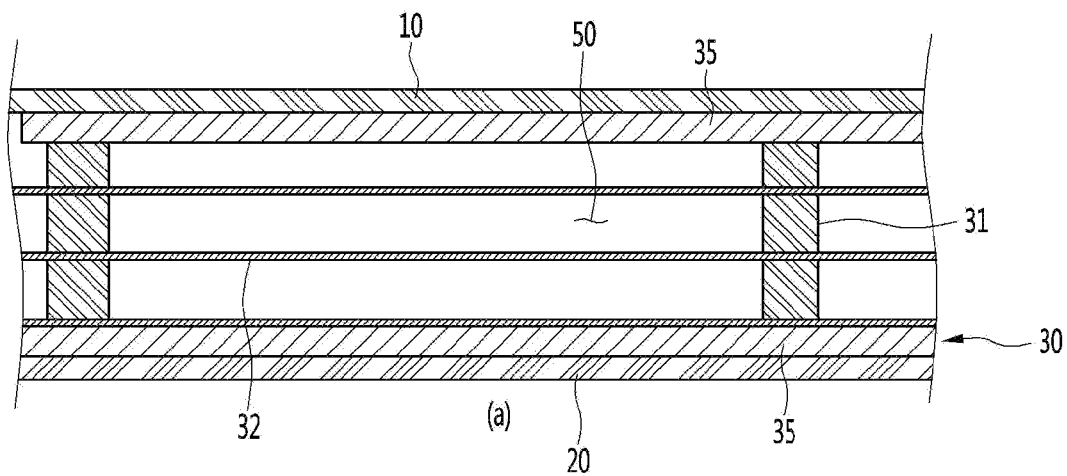
FIG. 23 is a view illustrating an internal configuration of a vacuum adiabatic body according to various embodiments.
Figure 23:
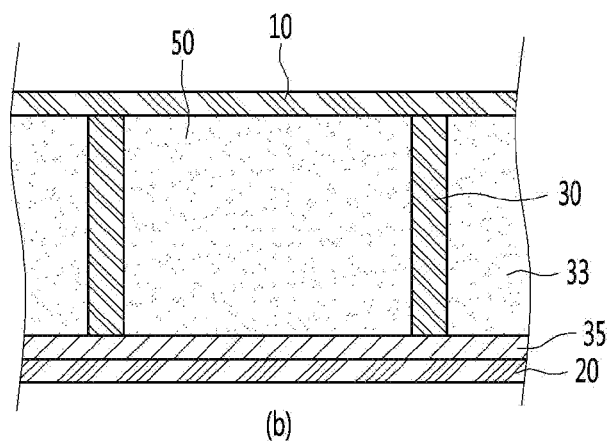
Figure 23:
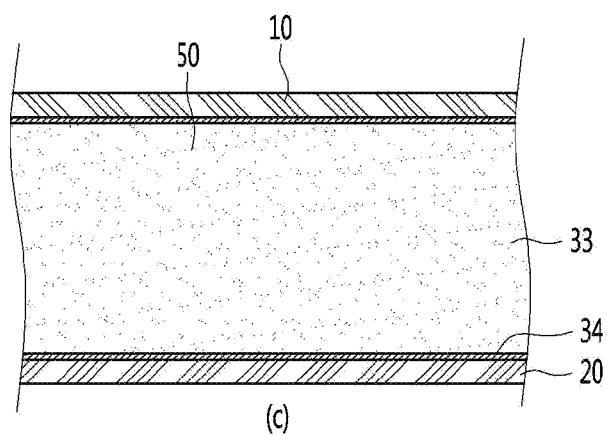

FIG. 23 is a view illustrating an internal configuration of a vacuum adiabatic body according to various embodiments.

First, referring to FIG. 23a, a vacuum space part 50 is provided in a third space having a different pressure from first and second spaces (i.e., inner and outer spaces), preferably, a vacuum state, thereby reducing adiabatic loss. The third space may be provided at a temperature between the temperature of the first space and the temperature of the second space. A constituent that resists heat transfer between the first space and the second space may be referred to as a heat resistance unit or assembly. Hereinafter, all various constituents may be applied, or the various constituents may be selectively applied. In a narrow sense, a constituent that resists heat transfer between the plate members 10 and 20 may be referred to as a heat resistance unit.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit or bar 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of polycarbonate (PC), glass fiber PC, low outgassing PC, polyphenylene sulfide (PPS), and liquid crystal polymer (LCP) so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members 10 and 20, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, at least one sheet of radiation resistance sheet 32 may be provided at a certain distance so as not to contact each other. At least one radiation resistance sheet 32 may be provided in a state in which it contacts the inner surface of the first or second plate member 10 or 20. Even when the vacuum space part 50 has a low height, one sheet of radiation resistance 32 sheet may be inserted. In case of the vehicle refrigerator 7, one sheet of radiation resistance sheet 32 may be inserted so that the vacuum adiabatic body 101 has a thin thickness, and the inner capacity of the cavity 100 is secured.

Referring to FIG. 23b, the distance between the plate members 10 and 20 is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body 101 may be fabricated without using the radiation resistance sheet 32.

Referring to FIG. 23c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

Figure 24:
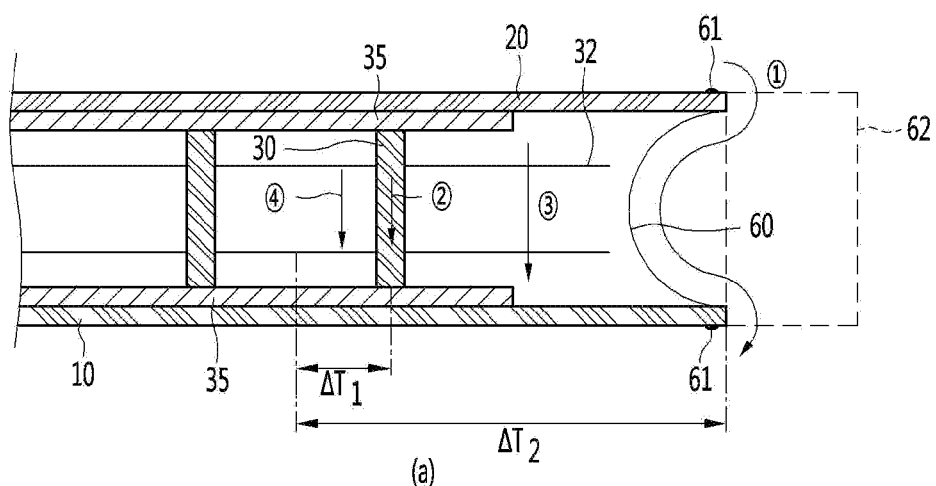
FIG. 24 is a view of a conductive resistance sheet and a peripheral portion of the conductive resistance sheet.
Figure 24:
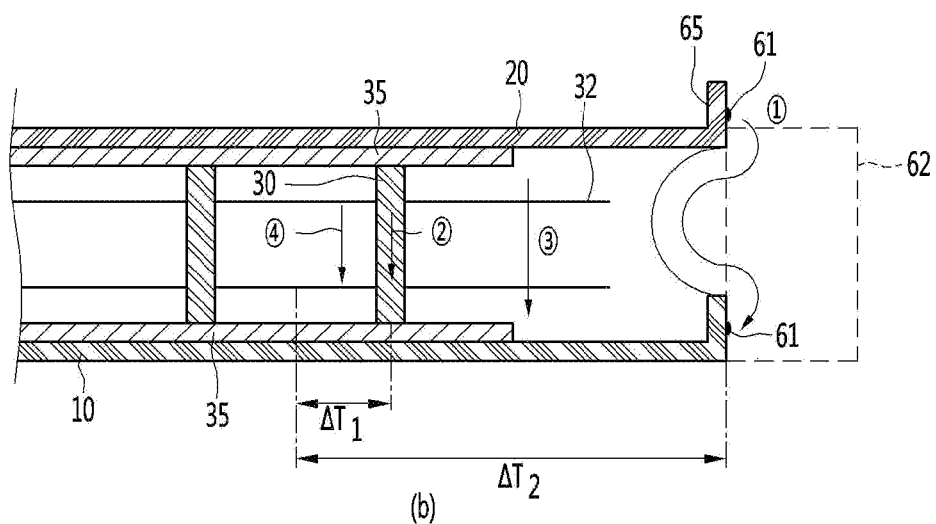

FIG. 24 is a view of a conductive resistance sheet and a peripheral portion of the conductive resistance sheet.

Referring to FIG. 24a, the first and second plate members 10 and 20 are to be sealed so as to vacuum the interior of the vacuum adiabatic body 101. In this case, since the two plate members 10 and 20 have different temperatures from each other, heat transfer may occur between the two plate members 10 and 20. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in unit of micrometer so as to reduce or minimize the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the vehicle refrigerator 7, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60, may be provided as an adiabatic structure or an adiabatic member, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described. Heat passing through the vacuum adiabatic body may be divided into surface conduction heat ① conducted along a surface of the vacuum adiabatic body 101, more specifically, the conductive resistance sheet 60, supporter conduction heat ② conducted along the supporting unit 30 provided inside the vacuum adiabatic body 101, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the plate members 10 and 20 may be changed, and the length of the conductive resistance sheet 60 may be changed. The transfer heat may be changed depending on a difference in temperature between the spaces (the first and second spaces) respectively provided by the plate members 10 and 20. In the embodiment, a preferred configuration of the vacuum adiabatic body 101 has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as about 19.6 mW/mK.

By performing a relative analysis on heat transfer amounts of the vacuum adiabatic body 101 of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK_{solid\ conduction\ heat} > eK_{radiation\ transfer\ heat} > eK_{gas\ conduction\ heat}$$ [Math Figure 1]

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body 101 is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60, a sectional area (A) of the conductive resistance sheet, a length (L) of the conductive resistance sheet, and a thermal conductivity (k) of the conductive resistance sheet 60 (the thermal conductivity of the conductive resistance sheet 60 is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance 33 is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance 33.

In the second plate member 20, a temperature difference between an average temperature of the second plate 20 and a temperature at a point at which a heat transfer path passing through the conductive resistance sheet 60 meets the second plate 20 may be largest. For example, when the second space is a region hotter than the first space, the temperature at the point at which the heat transfer path passing through the conductive resistance sheet meets the second plate member 20 becomes lowest. Similarly, when the second space is a region colder than the first space, the temperature at the point at which the heat transfer path passing through the conductive resistance sheet 60 meets the second plate member 20 becomes highest.

This means that the amount of heat transferred through other points except the surface conduction heat passing through the conductive resistance sheet should be controlled, and the entire heat transfer amount satisfying the vacuum adiabatic body 101 may be achieved only when the surface conduction heat occupies the largest heat transfer amount. To this end, a temperature variation of the conductive resistance sheet 60 may be controlled to be larger than that of the plate member 20.

Physical characteristics of the parts constituting the vacuum adiabatic body 101 will be described. In the vacuum adiabatic body 101, a force by vacuum pressure is applied to all of the parts. Therefore, a material having strength (N/m2) of a certain level may be used.

Referring to FIG. 24b, this configuration is the same as that of FIG. 24a except that portions at which the first plate member 10, the second plate member 20 are coupled to the conductive resistance sheet 60. Thus, the same part omits the description and only the characteristic changes are described in detail.

Ends of the plate members 10 and 20 may be bent to the second space having a high temperature to form a flange part 65. A welding part 61 may be provided on a top surface of the flange part 65 to couple the conductive resistance sheet 60 to the flange part 65. In this embodiment, the worker may perform welding while facing only any one surface. Thus, since it is unnecessary to perform two processes, the process may be convenient.

It is more preferable to apply the case in which welding of the inside and the outside are difficult as illustrated in FIG. 12a because a space of the vacuum space part 50 is narrow like the vehicle refrigerator 7.

Figure 25:
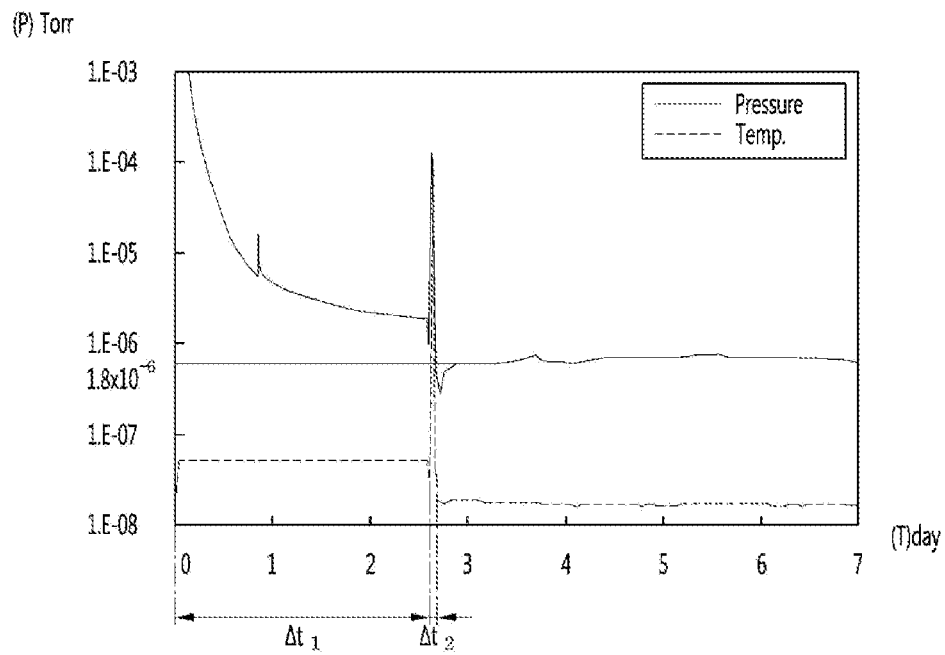
FIG. 25 is a graph illustrating results obtained by observing a time and a pressure in a process of exhausting the inside of the vacuum adiabatic body when a supporting unit is used.

FIG. 25 is a graph illustrating results obtained by observing a time and a pressure in a process of exhausting the inside of the vacuum adiabatic body 101 when a supporting unit 30 is used.

Referring to FIG. 25, in order to create the vacuum space part 50 to be in the vacuum state, a gas in the vacuum space part 50 is exhausted by a vacuum pump while evaporating a latent gas remaining in the parts of the vacuum space part 50 through heating. However, if the vacuum pressure reaches a certain level or more, there exists a point at which the level of the vacuum pressure is not increased any more ($\Delta t1$). After that, the getter in the exhaust and getter port 40 is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body 101, thereby setting the minimum internal pressure of the vacuum space part 50 to $1.8 \times 10^{-6}$ Torr.

Figure 26:
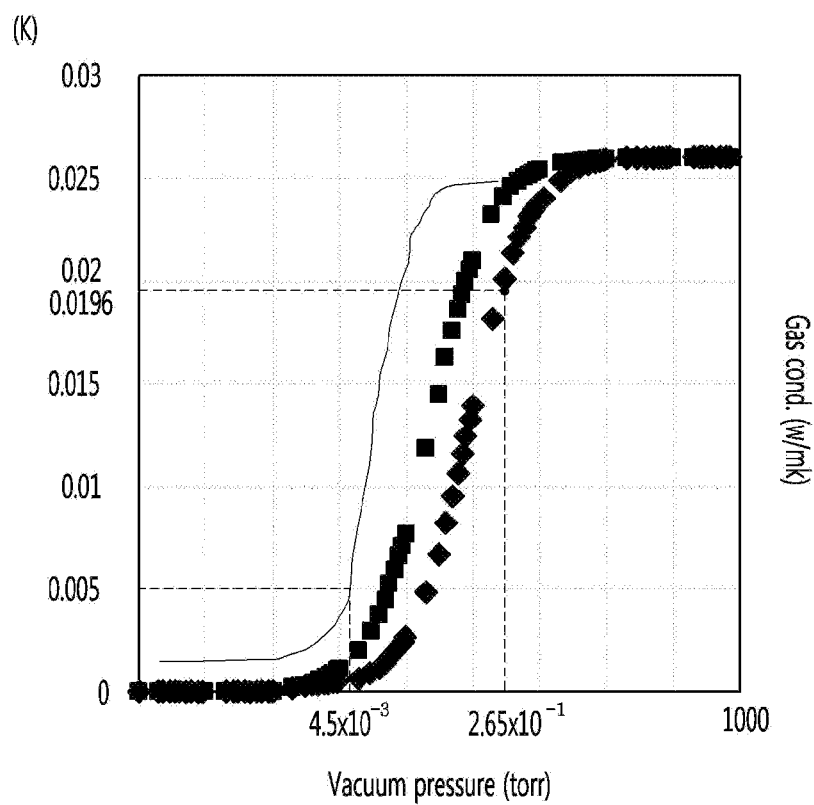
FIG. 26 is a graph illustrating results obtained by comparing a vacuum pressure with gas conductivity.

FIG. 26 is a graph obtained by comparing a vacuum pressure with gas conductivity.

Referring to FIG. 26, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member 10 or 20 adjacent thereto. When the radiation resistance sheet 32 does not exist inside vacuum space part 50, the gap is a distance between the first and second plate members 10 and 20.

It may be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit 30 but provided with the porous substance 33, the size of the gap ranges from a few micrometers to a few hundreds of micrometers. In this case, the amount of radiation heat transfer is small due to the porous substance 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous substance 33 are provided together in the vacuum space part, a vacuum pressure may be created and used, which is middle pressure between the vacuum pressure when only the supporting unit 30 is used and the vacuum pressure when only the porous substance 33 is used.

Hereinafter, another embodiment will be described.

In above-described embodiment, the refrigerator applied to the vehicle has been mainly described. However, the embodiment of the present disclosure is not limited thereto. For example, the ideas of the present disclosure may be applied to a warming apparatus and a refrigerating or warming apparatus. Of course, the embodiment of the present disclosure is not limited to a vehicle, but may be applied to any apparatus that generates a desired temperature of a product. However, it would be preferable for the vehicle refrigerator.

Particularly, in the case of the warming apparatus, a direction of the refrigerant may be configured to be opposite to that of the refrigerator. In the case of the refrigerating or warming apparatus, four sides or passages that reverse the direction of the refrigerant may be installed on the refrigerant passage according to whether the refrigerant operates as a refrigerator or a warming apparatus.

The condensation module may be referred to as a first heat exchange module, and the evaporation module may be referred to as a second heat exchange module regardless of the change of the refrigerator and the warming apparatus. Here, the first and second meanings denote the division of the heat exchange module and may be exchanged with each other.

INDUSTRIAL APPLICABILITY

According to the embodiments, the vehicle refrigerator that receives only power from the outside and is independent apparatus may be efficiently realized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Technical Problem

Embodiments provide a vacuum adiabatic body that is capable of improving energy efficiency, a refrigerating or warming apparatus, and a vehicle.

Embodiments also provide a vacuum adiabatic body which is directly accessible to a driver while using a refrigeration cycle, a refrigerating or warming apparatus, and a vehicle.

Embodiments also provide a vacuum adiabatic body that is capable of increasing a capacity of a refrigerator, a refrigerating or warming apparatus, and a vehicle.

Embodiments also provide a vacuum adiabatic body that is capable of blocking an access of foreign substances, a refrigerating or warming apparatus, and a vehicle.

Technical Solution

In one embodiment, a vacuum adiabatic body includes: first and second plate members or plates, which respectively define at least portions of walls for a first space and a second space having a temperature different from that of the first space, and has a third space that is in a vacuum state; a sealing part sealing the first plate member and the second plate member; and a conduit connecting the first space to the second space by allowing the sealing part to pass outside the third space, thereby improving energy efficiency.

The conduit may include two tubes through which refrigerants having temperatures different from each other flows, a heat exchanger may be disposed in each of the first and second spaces, and the at least two tubes may be surrounded by a single regeneration adiabatic member so as to be heat-exchanged with each other, thereby further improving the energy efficiency.

In another embodiment, a refrigerating or warming apparatus and a vehicle includes: a cavity or a compartment disposed at a side facing a driver and having at least a wall provided as a vacuum adiabatic body; and a machine room disposed at a side facing an assistant driver or a passenger so that the refrigerating or warming apparatus is directly accessible to a driver while using a refrigeration cycle that is capable of obtaining high energy efficiency.

The refrigerant conduit may extend along the wall of the cavity to significantly increase in capacity within the refrigerating or warming apparatus.

An upper portion of a console space of the vehicle may be closed, and an upper end edge of the cavity may be sealed to prevent foreign substances from being introduced.

Advantageous Effects

The conduit may not pass through the vacuum adiabatic body having the high vacuum degree according to the vacuum adiabatic body including the conduit connecting the first space to the second space by passing through the sealing part outside the third space. According to this configuration, the air leakage of the vacuum adiabatic body may be prevented, and the vacuum adiabatic body may be used for a long time even though the vacuum adiabatic body is mounted in the vehicle having the large vibration.

The conduit used in the refrigerating or warming apparatus to which the vacuum adiabatic body is applied may include at least two tubes through which the refrigerant having temperatures different from each other flows, and the heat exchanger may be provided in each of the first space and the second space. Thus, the single regeneration adiabatic member may surround the at least two tubes to perform the heat exchange. According to the above-described configuration, the refrigerating or warming apparatus applied to the vehicle may be quickly cooled or heated and thus operate with high time-efficiency.

According to the vehicle-mount type refrigerating or warming apparatus including the cavity which is provided in the side facing the driver and of which at least a portion of the wall is provided as the vacuum adiabatic body and the machine room provided in the side facing the assistant driver, the driver that is the main user may more easily use the refrigerating or warming apparatus.

The refrigerant conduit may extend along the wall of the cavity to secure the space in which the refrigerant flows even in the narrow space and contribute to the heat exchange with the refrigerant and the integration of the machine room.

The console cover which covers the entire upper portion of the console of the vehicle and by which the upper end edge of the cavity is sealed may be provided to prevent the machine room of the refrigerating or warming apparatus from being contaminated due to the introduction of the foreign substances and prevent the machine or apparatus from being broken down due to the penetration of the liquid.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An adiabatic body comprising:
a first plate configured to define at least a portion of a wall for a compartment;
a second plate configured to define at least a portion of the wall for the compartment;
a space between the first plate and the second plate, the space configured to be in a vacuum state; and
a conduit that extends from inside the compartment to outside the compartment by passing over a top surface of the compartment,
wherein the conduit is formed to be continuously bent to be arranged adjacent to an inner wall of the compartment and an outer wall of the compartment.

2. The adiabatic body according to claim 1, wherein the conduit comprises a first tube configured to allow refrigerant to flow, and a second tube configured to allow refrigerant to flow, wherein a temperature of refrigerant that flows in the first tube has a first temperature, and a temperature of refrigerant that flows in the second tube has a second temperature different from the first temperature.

3. The adiabatic body according to claim 1, wherein the conduit is to connect a first heat exchanger disposed inside the compartment with a second heat exchanger disposed outside the compartment.

4. The adiabatic body according to claim 1, wherein the conduit is to extend from the inside of the compartment by passing over uncut portion on a top of the adiabatic body to the outside of the compartment without directly passing through the space.

5. The adiabatic body according to claim 1, comprising a door configured to open and close an opening of the compartment, and the conduit is to pass between the top surface of the compartment and the door.

6. The adiabatic body according to claim 1, wherein the conduit is to pass between an edge of the first plate and a door configured to open and close an opening of the compartment.

7. The adiabatic body according to claim 1, wherein the conduit is to pass between a conductive resistance sheet and a door, the conductive resistance sheet disposed adjacent the first plate, and the door configured to open and close an opening of the compartment.

8. The adiabatic body according to claim 1, wherein the conduit is to pass between a seal and a door, the seal configured to seal the first plate to the second plate, and the door configured to open and close an opening of the compartment.

9. The adiabatic body according to claim 1, comprising a cover configured to cover an opening of the compartment, and the conduit is to pass over part of the cover.

10. The adiabatic body according to claim 1, comprising a door configured to open and close an opening of the compartment, and the door is opened using a hinge point as a support point, and the conduit passes through the hinge point of the door.

11. The adiabatic body according to claim 1, wherein the conduit is to pass between a conductive resistance sheet and a cover, the conductive resistance sheet disposed adjacent the first plate, and the cover configured to cover an opening of the compartment.

12. The adiabatic body according to claim 1, wherein the conduit is to pass between a seal and a cover, the seal configured to seal the first plate to the second plate, and the cover configured to cover an opening of the compartment.

13. The adiabatic body according to claim 1, comprising an adiabatic member to surround a portion of the conduit, and part of the adiabatic member is to pass over the top surface of the compartment.

14. The adiabatic body according to claim 1, comprising an adiabatic member to surround a portion of the conduit, and part of the adiabatic member is disposed adjacent to a cover configured to cover an opening of the compartment.

15. The adiabatic body according to claim 1, comprising an adiabatic member to surround a portion of the conduit, and part of the adiabatic member is disposed adjacent to a door configured to open and close an opening of the compartment.

16. An adiabatic body comprising:
a first plate configured to define at least a portion of a wall for a compartment;
a second plate configured to define at least a portion of the wall for the compartment;
a space between the first plate and the second plate, the space configured to be in a vacuum state; and
a conduit that extends from inside the compartment to outside the compartment by passing over uncut portion on a top of the adiabatic body and without directly passing through the space between the first plate and the second plate.

17. The adiabatic body according to claim 16, comprising an adiabatic member to surround a portion of the conduit outside the compartment.

18. The adiabatic body according to claim 16, comprising an adiabatic member to surround a portion of the conduit inside the compartment.

19. An adiabatic body comprising:
a first plate configured to be a portion of a wall that defines part of a compartment;
a second plate configured to be a portion of the wall;
a space between the first plate and the second plate, the space configured to be in a vacuum state; and
a conduit disposed over a top of the compartment and extending to outside the compartment, and the conduit is configured such that refrigerant is to flow in the conduit over the top of the compartment,
wherein the conduit is to pass between an edge of the first plate and a cover configured to cover an opening of the compartment.

20. The adiabatic body according to claim 19, comprising an adiabatic member to surround a portion of the conduit, and part of the adiabatic member is to pass over the top of the compartment.

* * * * *